US010386523B2

(12) United States Patent
Donald et al.

(10) Patent No.: US 10,386,523 B2
(45) Date of Patent: Aug. 20, 2019

(54) SUBSURFACE FORMATION MODELING WITH INTEGRATED STRESS PROFILES

(71) Applicant: Schlumberger Technology Corporation, Sugar Land, TX (US)

(72) Inventors: John Adam Donald, Abu Dhabi (AE); GongRui Yan, Beijing (CN); Haitao Sun, Cambridge, MS (US); Alexander Ramirez, Bogota (CO); Francisco Gomez, Beijing (CN); Xinyu Liang, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 51 days.

(21) Appl. No.: 15/301,094

(22) PCT Filed: Mar. 31, 2014

(86) PCT No.: PCT/CN2014/074433
§ 371 (c)(1),
(2) Date: Sep. 30, 2016

(87) PCT Pub. No.: WO2015/149237
PCT Pub. Date: Oct. 8, 2015

(65) Prior Publication Data
US 2017/0023691 A1 Jan. 26, 2017

(51) Int. Cl.
*G01V 1/50* (2006.01)
*G01V 11/00* (2006.01)

(52) U.S. Cl.
CPC ............... *G01V 1/50* (2013.01); *G01V 11/00* (2013.01); *G01V 11/002* (2013.01)

(58) Field of Classification Search
CPC .......... G01V 1/50; G01V 11/00; G01V 11/002
See application file for complete search history.

(56) References Cited

U.S. PATENT DOCUMENTS

2004/0001388 A1* 1/2004 Kriegshauser ........... G01V 1/48
367/21
2004/0176911 A1* 9/2004 Bratton .................... G01V 1/50
702/6
(Continued)

FOREIGN PATENT DOCUMENTS

CN 101553742 A 10/2009
CN 102105900 A 6/2011
(Continued)

OTHER PUBLICATIONS

PCT/CN2014/074433, PCT International Search Report and Written Opinion, dated Dec. 31, 2014, 12 pgs.
(Continued)

Primary Examiner — Mischita L Henson

(57) ABSTRACT

A method, apparatus, and program product model stress characteristics of a subsurface formation based at least in part on acoustic data and image data associated with the subsurface formation. The acoustic data is analyzed to determine acoustic based stress values, and the image data is analyzed to determine image based stress values. The acoustic based stress values and the image based stress values are integrated to generate an integrated stress profile that includes one or more modeled stress characteristics of the subsurface volume.

21 Claims, 21 Drawing Sheets

(56) References Cited

U.S. PATENT DOCUMENTS

| | | | |
|---|---|---|---|
| 2007/0143020 | A1 | 6/2007 | Bradford et al. |
| 2007/0294034 | A1* | 12/2007 | Bratton .................. E21B 41/00 702/6 |
| 2009/0070042 | A1 | 3/2009 | Birchwood et al. |
| 2009/0109794 | A1* | 4/2009 | Sinha .................... E21B 49/006 367/35 |
| 2010/0157737 | A1* | 6/2010 | Miller ................... E21B 33/124 367/117 |
| 2010/0238764 | A1* | 9/2010 | Pistre ........................ G01V 1/30 367/25 |
| 2011/0007604 | A1 | 1/2011 | Liu et al. |
| 2013/0188452 | A1 | 7/2013 | St-onge et al. |
| 2015/0241591 | A1* | 8/2015 | Burmester ............... G01V 3/20 702/7 |

FOREIGN PATENT DOCUMENTS

| | | |
|---|---|---|
| CN | 103261917 A | 8/2013 |
| EP | 2157442 A1 | 2/2010 |

OTHER PUBLICATIONS

Aadnov, B.S. et al, "Classification of Drill-Induce Fractures and Their Relationship to Insitu Stress Directions" 1988 Log Analyst, 39, 27-42.

Cesaro, M. et al., "Shaping up to stress in the Apennines," in Schlumberger Well Evaluation Conference, 2000, pp. 34-73, Milan, Italy.

Donald, A., et al, "Advancements in Acoustic Technique for Evaluating Open Natural Fractures, paper QQ" SPWLA 47th Annual Logging Symposium, Veracruz, Mexico, Jun. 4-7, 2006.

Donald, J.A., et al, "Stress Characterization in Deep Boreholes Using Acoustoelasticity, Proceedings of SINOROCK 2013", Shanghai, PR of China, Jun. 18-20, 2013. Rock Characterisation, Modeling and Engineering Design Methods—Feng, Hudson & Tan (Eds) © 2013 Taylor & Francis Group, London, ISBN 978-1-138-00057-5.

Etchecopar, A. et al, "Borehole images for assessing present day stresses," Bull. Soc. Geol., 2013, pp. 307-318, vol. 184, issue No. 4-5, France.

Etchecopar, A., et al, "An Inverse Problem in Microtectonies for the Determination of Stress Tensors From Fault Striation Analysis" 1981, Journal of Structural Geology, 3, No. 1, 51-65.

Kirsch, "The Theory of Elasticity and the Requirements of the Science of the Strength Materials," Lecture presented at the 39th general meeting of the Association of German Engineers at Chemitz on Jun. 8, 1898, Zeitschrift des Vereines Deutscher Ingenieure, No. 42, Saturday, Jul. 16, 1898, vol. 42, pp. 797-804.

Hillis, R.R, et al, "The Australian Stress Map" 2000, J. Geol. Soc., London, 157, 915-921.

Lei, T., et al, "Estimation of Horizontal Stress Magnitudes and Stress Coefficients of Velocities Using Borehole Sonic Data", 2012 Geophysics, vol. 77, No. 3, May-June.

Pistre, V., et al, "A Modular Wireline Sonic Tool for Measurements of 3D (Azimuthal, Radial and Axial) Formation Acoustic Properties" SPWLA 46th Annual Logging Symposium. New Orleans, Jun. 26-29, 2005.

Pistre, V., et al, "Determining stress regime and Q factor from sonic data" SPWLA 50th Annual Logging Symposium, Jun. 21-24, 2009.

Plumb, R.A., et al, "Stress-Induced Borehole Elongation: A Comparison Between the Four-Arm Dipmeter and the Borehole Televiewer in the Auburn Geothermal Well" 1985 J. Geophys. Res., 90, 5513-5521.

Sammonds, P.R., et al, "Laboratory Investigation of Acoustic Emission and Elastic Wave Velocity Changes During Rock Failure Under Triaxial Stresses", in Rocks at Great Depth, Maury & Fourmaintraux, eds., Balkema, Rotterdam 1989, 427-434.

Sinha, B. K., et al, "Estimation of formation stresses using radial variation of the three shear moduli in a well—A case study from a high-pressure and high temperature field in the Norwegian continental shelf" Presented at the SPE Annual Technical Conference and Exhibition, 2007 1-9.

Sinha, B. K., et al, "Dipole dispersion crossover and sonic logs in a limestone reservoir" 2000 Geophysics 65(2): 390-407.

Sinha, B.K., et al, "Stress-Induced Azimuthal Anisotropy in Borehole Flexural Waves" 1996 Geophysics, 61, No. 6, pp. 1899-1907.

Sinha, B. K., et al, "Radial Profiling of the Three Formation Shear Moduli and Its Applications to Well Completions" 2006 Geophysics, 71, No. 6, E65-E77.

Sinha, B., et al, "Formation Nonlinear Constants From Sonic Measurements At Two Borehole Pressures" 1999, Geophysics, 64, 1890-1900.

Sun, H., et al, "Relating Shear Sonic Anisotropy Directions to Stress in Deviated Wells" 2010 Geophysics, vol. 75, No. 5, 56-67.

Winkler, K.W., et al, "Measurements of Third Order Elastic Constants in Rocks" 1996, J. Acoust. Soc. Am., 100, p. 1392-1398.

Winkler, K. W., et al, "Effects of Borehole Stress Concentrations on Dipole Anisotropy Measurements" 1998 Geophysics, 63, 11-17.

Zoback, M. D., et al, "Well Bore Breakouts and In Situ Stress" 1985 J. Geophys. Res. 90(B7): 5523-5530.

* cited by examiner

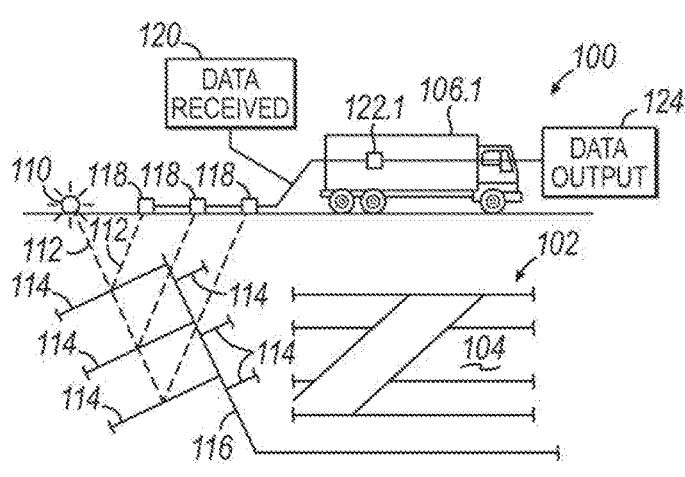
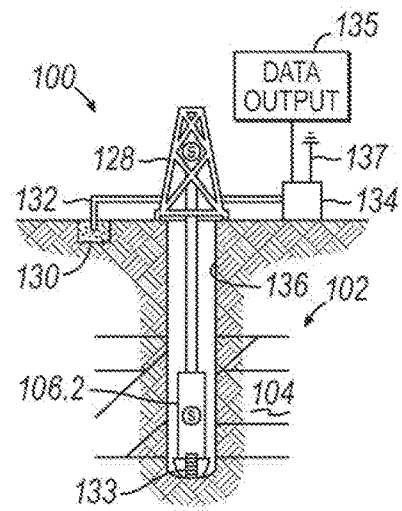
FIG. 2A  FIG. 2B
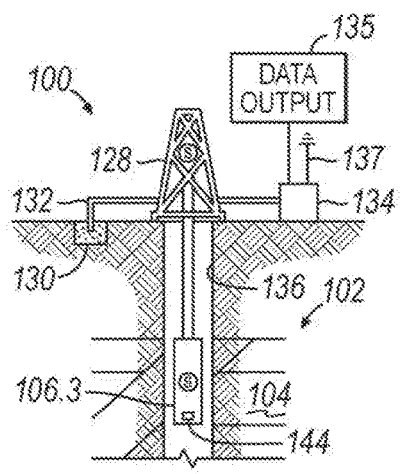
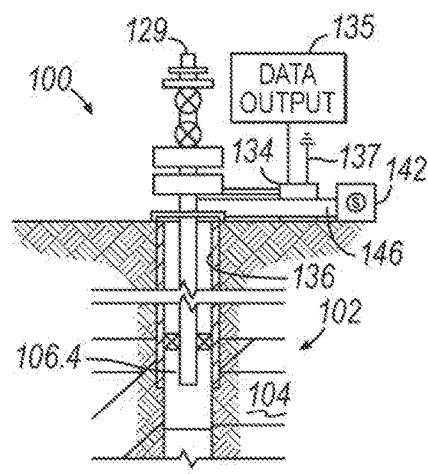
FIG. 2C  FIG. 2D

| STRESS REGIME | Q FACTOR AS A FUNCTION OF | | SHEAR MODULI RANKING |
|---|---|---|---|
| | STRESS | SHEAR MODULI | |
| NORMAL FAULT | $\dfrac{\sigma_H - \sigma_h}{\sigma_V - \sigma_h}$ | $0 \leq \dfrac{C_{55} - C_{44}}{C_{55} - C_{66}} \leq 1$ | $C_{55} > C_{44} > C_{66}$ |
| STRIKE SLIP FAULT | $2 - \dfrac{\sigma_V - \sigma_h}{\sigma_H - \sigma_h}$ | $1 \leq \dfrac{C_{55} + C_{66} - 2C_{44}}{C_{55} - C_{44}} \leq 2$ | $C_{55} > C_{66} > C_{44}$ |
| THRUST FAULT | $2 + \dfrac{\sigma_h - \sigma_V}{\sigma_H - \sigma_V}$ | $2 \leq \dfrac{3C_{66} - 2C_{44} - C_{55}}{C_{66} - C_{44}} \leq 3$ | $C_{66} > C_{55} > C_{44}$ |

SUBSURFACE FORMATION MODELING WITH INTEGRATED STRESS PROFILES

BACKGROUND

Geological and geophysical data may be analyzed and interpreted using specialized software to model various properties for subsurface formations. In general, such subsurface formations may be associated with an oil field having one or more wellbores, where one or more oil wells may be operated. In general, exploration for oil and gas and other natural resources and extraction thereof may utilize the analyzed and interpreted geological and geophysical data.

SUMMARY

Embodiments of the invention disclosed herein provide a method, apparatus, and program product that models subsurface formations. In some embodiments, a subsurface formation may be associated with an oil field or other such natural resource recovery areas. Acoustic data and image data associated with the subsurface formation may be received. The acoustic data may be analyzed to determine acoustic based stress values for the subsurface formation, and the image data may be analyzed to determine image based stress values for the subsurface formation. The acoustic based stress values and the image based stress values may be integrated to generate an integrated stress profile for the subsurface formation. In general, the integrated stress profile may comprise one or more stress related values associated with the subsurface formation. For example, the integrated stress profile may comprise horizontal stress magnitudes, directions of maximum horizontal stresses, and/or other such stress related values for the subsurface formation. A model for the subsurface formation may be generated that comprises one or more stress related values for the subsurface formation based at least in part on the integrated stress profile. In some embodiments the modeled subsurface formation may be included in a model that further includes one or more wellbores of an oil field.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 2A-2D illustrate simplified, schematic views of an oilfield having subterranean formations containing reservoirs therein in accordance with implementations of various technologies and techniques described herein.

FIG. 7F provides an example chart that illustrates stress magnitudes and non-linear elastic outputs using shear radial profiles and far field 3 shear moduli.

DETAILED DESCRIPTION

The herein-in described embodiments of the invention provide a method, apparatus, and program product that may generate integrated stress profiles for one or more subsurface formations based at least in part on acoustic data and image data associated with the one or more subsurface formations. In some embodiments, the integrated stress profiles of the one or more subsurface formations may be used to generate a model that indicates one or more stress related values for the one or more subsurface formations. Generally, the integrated stress profile may include maximum and minimum stress magnitudes and directions, a stress regime associated with the subsurface formation (e.g., normal fault, strike-slip fault, thrust fault, etc.), and/or other such stress related information.

Furthermore, the modeled one or more subsurface formations may be included in a subsurface model for an area and/or volume. For example, a three dimensional model associated with an oil field comprising one or more wellbores may include the modeled subsurface formations, where the three dimensional model may be visually output on a display of a computing system for review by a user when monitoring production of the oil wells associated with the wellbores. As another example, a three dimensional model associated with a potential oil field may be generated that includes one or more modeled subsurface formations, where the three dimensional model may be visually output on a display of a computing system for review by a user when analyzing the potential oil field for wellbore placement, etc.

Other variations and modifications will be apparent to one of ordinary skill in the art.

HARDWARE AND SOFTWARE ENVIRONMENT

Figure 1:
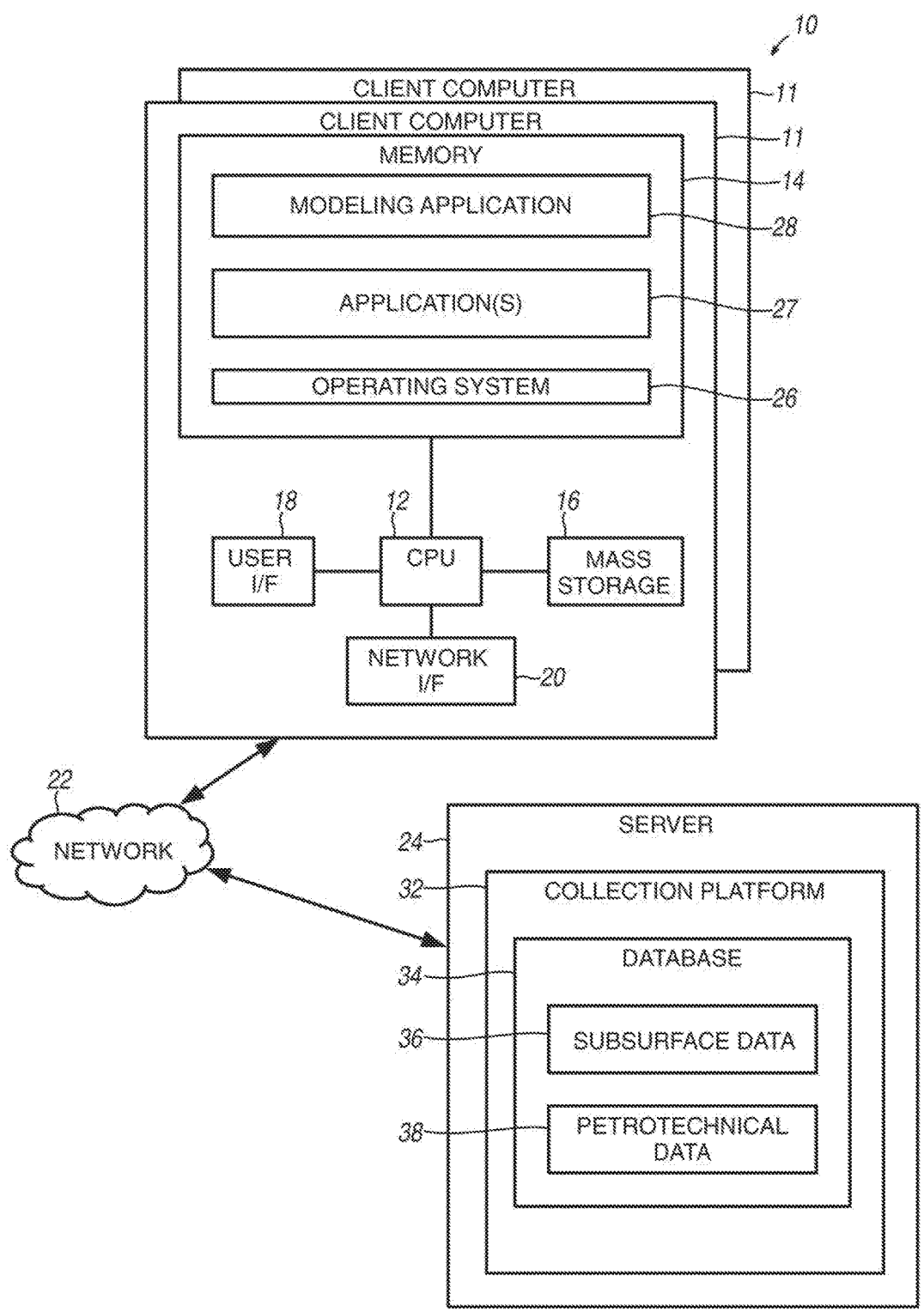
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 11, e.g., client computers, each including a central processing unit 12 including at least one hardware-based microprocessor coupled to a memory 14, which may represent the random access memory (RAM) devices comprising the main storage of a computer 11, as well as any supplemental levels of memory, e.g., cache memories, non-volatile or backup memories (e.g., programmable or flash memories), read-only memories, etc. In addition, memory 14 may be considered to include memory storage physically located elsewhere in a computer 11, e.g., any cache memory in a microprocessor, as well as any storage capacity used as a virtual memory, e.g., as stored on a mass storage device 16 or on another computer coupled to a computer 11.

Each computer 11 also generally receives a number of inputs and outputs for communicating information externally. For interface with a user or operator, a computer 11 generally includes a user interface 18 incorporating one or more user input devices, e.g., a keyboard, a pointing device, a display, a printer, etc. Otherwise, user input may be received, e.g., over a network interface 20 coupled to a network 22, from one or more servers 24. A computer 11 also may be in communication with one or more mass storage devices 16, which may be, for example, internal hard disk storage devices, external hard disk storage devices, storage area network devices, etc.

A computer 11 generally operates under the control of an operating system 26 and executes or otherwise relies upon various computer software applications 27, components, programs, objects, modules, data structures, etc. For example, a subsurface modeling application 28 may be used to determine and model various characteristics of subsurface formations. The subsurface modeling application 28 may interface with a collection platform 32, which may include a database 34 within which may be stored collected subsurface data 36 and/or petrotechnical data 38. The subsurface data may include acoustic data and image data collected for a subsurface volume. For example, subsurface data 36 and the petrotechnical data 38 may correspond to one or more oilfields of an oil and gas production system. In this example, the subsurface data may include acoustic data (e.g., surface and/or borehole seismic data, sonic data, ultrasonic data) and/or borehole image data associated with and/or collected from one or more wellbores of the oil and gas production system. The collection platform 32 and/or database 34 may be implemented using multiple servers 24 in some implementations, and it will be appreciated that each server 24 may incorporate processors, memory, and other hardware components similar to a client computer 11. In addition, in some implementations collection platform 32 may be implemented within a database.

In one non-limiting embodiment, for example, modeling application 28 and/or the collection platform 32 may be compatible with and/or implemented as a component of the Petrel software platform and environment and the Techlog software platform and environment, which are available from Schlumberger Ltd. and its affiliates. It will be appreciated, however, that the techniques discussed herein may be utilized in connection with other petro-technical applications/platforms, so the invention is not limited to the particular software platforms and environments discussed herein. Moreover, those skilled in the art will appreciate that various operations and/or functionality of the modeling application 28 and/or the collection platform 32 may be implemented on one or more client computers 11 and/or servers 24.

In general, the routines executed to implement the embodiments disclosed herein, whether implemented as part of an operating system or a specific application, component, program, object, module or sequence of instructions/operations, or even a subset thereof, will be referred to herein as "computer program code," or simply "program code." Program code generally comprises one or more instructions that are resident at various times in various memory and storage devices in a computer, and that, when read and executed by one or more processors in a computer, cause that computer to perform the steps necessary to execute steps or elements embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

OILFIELD OPERATIONS

FIGS. 2a-2d illustrate simplified, schematic views of an oilfield 100 having subterranean formation 102 containing reservoir 104 therein in accordance with implementations of various technologies and techniques described herein. FIG. 2a illustrates a survey operation being performed by a survey tool, such as seismic truck 106.1, to measure properties of the subterranean formation. The survey operation is a seismic survey operation for producing sound vibrations. In FIG. 2a, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 2b illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is usually filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan generally sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 2c illustrates a wireline operation being performed by wireline tool 106.3 suspended by rig 128 and into wellbore 136 of FIG. 2b. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein. In general, wireline tool 106.3 may thereby collect acoustic data and/or image data for a subsurface volume associated with a wellbore.

Wireline tool 106.3 may be operatively connected to, for example, geophones 118 and a computer 122.1 of a seismic truck 106.1 of FIG. 2a. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 2d illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2b-2d illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2a-2d are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
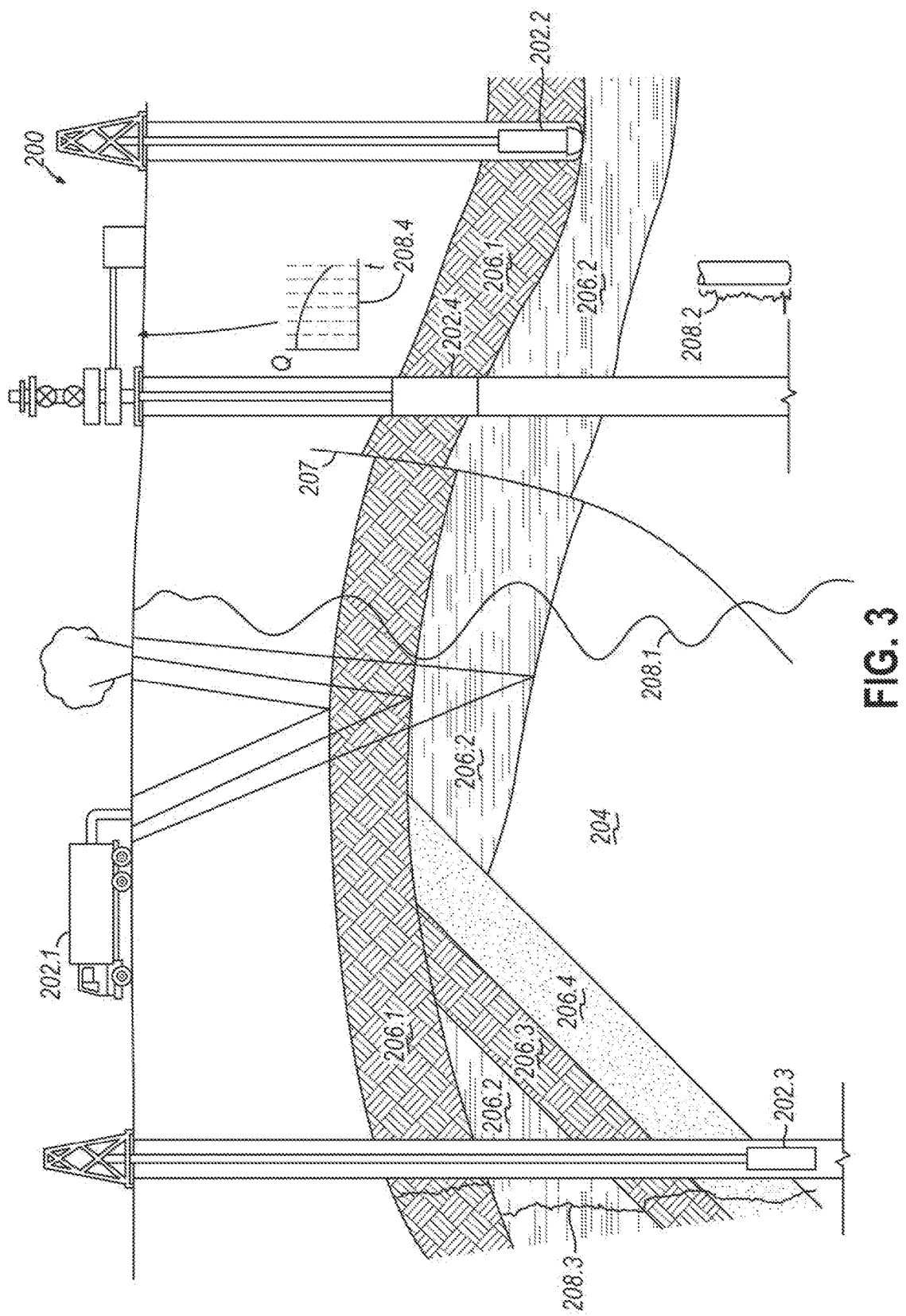
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2a-2d, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
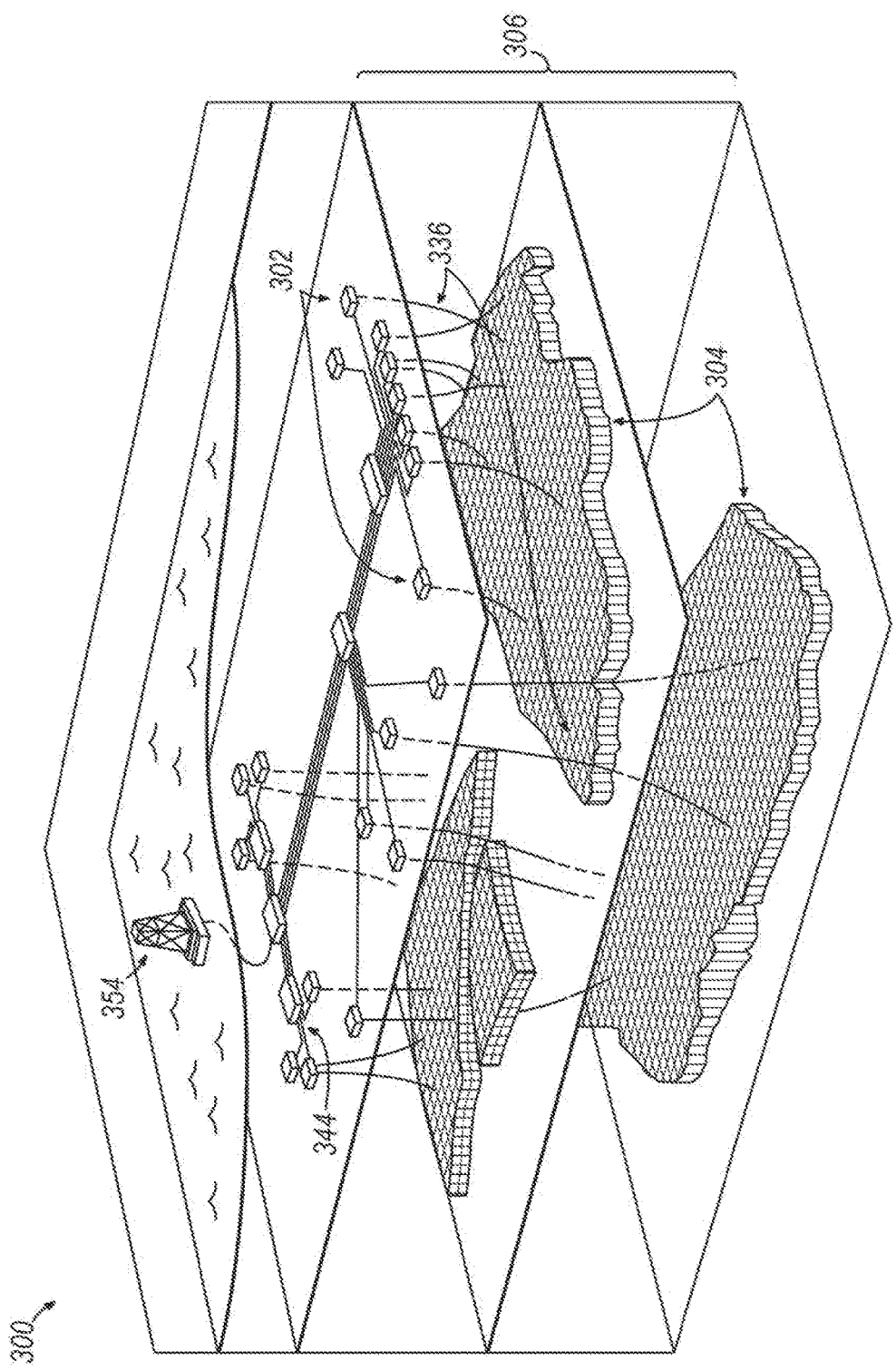
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

SUBSURFACE FORMATION MODELING

In general, embodiments of the invention may analyze acoustic data and image data associated with a subsurface volume to generate a model that includes modeled stress characteristics of one or more subsurface formations. In general, the model may include an in-situ stress regime, stress orientations (directions), and/or stress magnitudes for one or more subsurface formations. Moreover, consistent with some embodiments of the invention, the modeled stress values/characteristics may be associated with and/or implemented into a model for one or more wellbores of an oil and gas production system, such that a user may review the modeled stress values/characteristics and/or the modeled one or more wellbores by outputting a visualization based on the model at a client computer.

Figure 5:
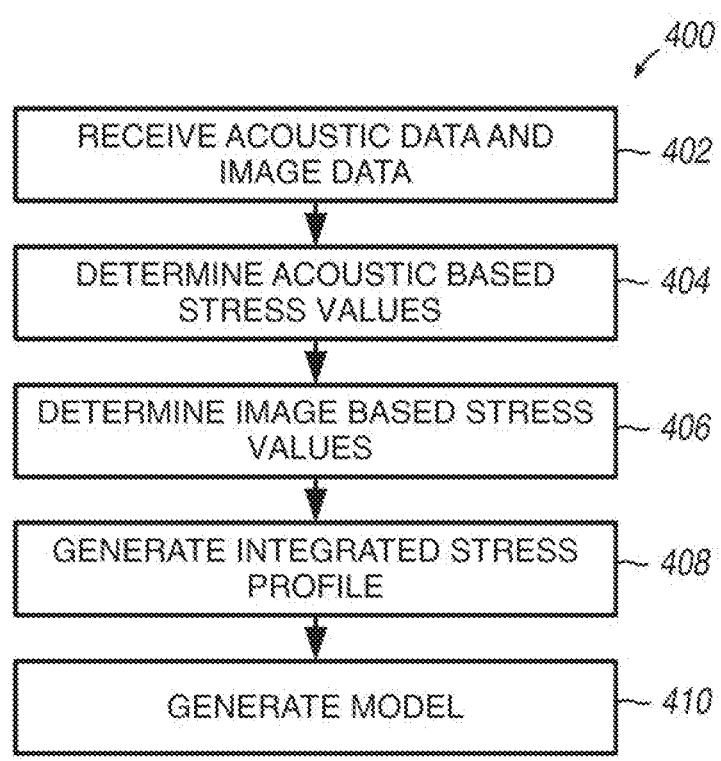
FIG. 5 provides a flowchart that illustrates a sequence of operations that may be performed by the data processing system of FIG. 1 to generate a model for one of more subsurface formations of a subsurface volume.

Turning now to FIG. 5, this figure comprises a flowchart 400 that illustrates a sequence of operations that may be performed by a computing system consistent with embodiments of the invention to generate a model that includes one or more stress characteristics for a subsurface formation. Acoustic data and image data associated with the subsurface formation may be received (block 402). In general, the acoustic data and/or image data may be collected from one or more oil fields and/or wellbores from one or more data collection sources, including for example, wireline, from sensors operating while drilling, tractor, and/or other such sources. The acoustic data may be analyzed to determine one or more acoustic based stress values (block 404). Acoustic based stress values include, for example, a maximum stress to minimum stress ratio, a maximum stress direction, a minimum stress direction, a maximum stress magnitude, a minimum stress magnitude, stress regime, and/or other such stress values that may be derived from acoustic based analysis. The image data may be analyzed to determine one or more image based stress values for the subsurface formation (block 406). Image based stress values include, for example, maximum stress direction, minimum stress direction, maximum stress magnitude, minimum stress magnitude, and/or other such stress related values that may be derived from image based analysis.

The acoustic based stress values of the acoustic based stress profile and the image based stress values of the image based stress profile may be integrated to generate an integrated stress profile for the subsurface formation (block 408). In general, integrating the acoustic and image based stress values may include comparing the independently determined stress value to determine/validate the accuracy of the determined values. Moreover, integration of the acoustic and image based stress values may comprise performing weighted combinations thereof based on determined sensitivities for various types of input data and/or prediction models associated with the stress values and/or types of input data.

A model for the subsurface formation may be generated based at least in part on the integrated stress profile (block 410). In some embodiments of the invention, the subsurface formation may be associated with an oil and gas production system comprising one or more wellbores. In these embodiments, acoustic data and/or image data may be collected from one or more wellbore data collection devices (e.g., a wireline tool) and/or from surface data collection devices (e.g., a seismic truck). The model may include wellbore information, production information, oil and gas production system information, and stress characteristics for one or more subsurface formations. Moreover, generation of the integrated stress profile may be based at least in part on additional data collected for the one or more wellbores, including, for example, pore pressure, wellbore pressure, friction angle, Biot constant, and/or overburden stress data. In other embodiments, an integrated stress profile may be used in other applications such as mining, geothermal, groundwater, carbon sequestration, etc.

Figure 6:
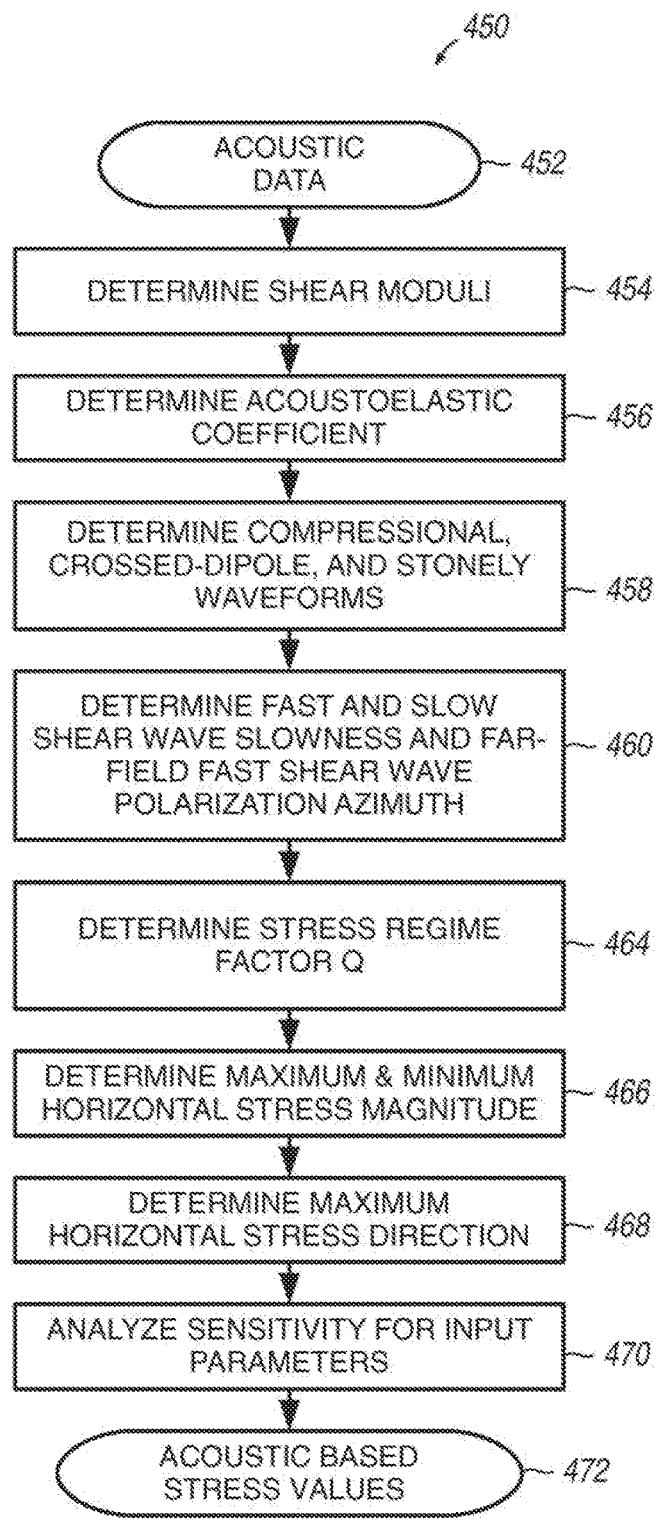
FIG. 6 provides a flowchart that illustrates a sequence of operations that may be performed by the data processing system of FIG. 1 to determine acoustic based stress values for an acoustic based stress profile.

FIG. 6 provides a flowchart 450 that illustrates a sequence of operations that may be performed by a computing system consistent with embodiments of the invention to analyze acoustic data (block 452) to determine acoustic based stress values of an acoustic based stress profile. Consistent with some embodiments of the invention, shear moduli may be determined (block 454). Shear moduli may be caused by differences in stresses within a subsurface formation that is stress sensitive. Consistent with embodiments of the invention, three shear moduli (c44, c55, and c66) may be determined by analyzing sonic data of the acoustic data. In embodiments of the invention in which sonic data has been collected for a wellbore, the presence of a wireline tool for collecting such data may be accounted for when determining the shear moduli. Generally, determining the shear moduli for one or more subsurface formations based on acoustic data may be performed for subsurface formations considered stress-sensitive, or stress dependent. Stress dependent generally refers either to externally applied stress or to a stress amplitude of a measurement wave.

Figure 7A:
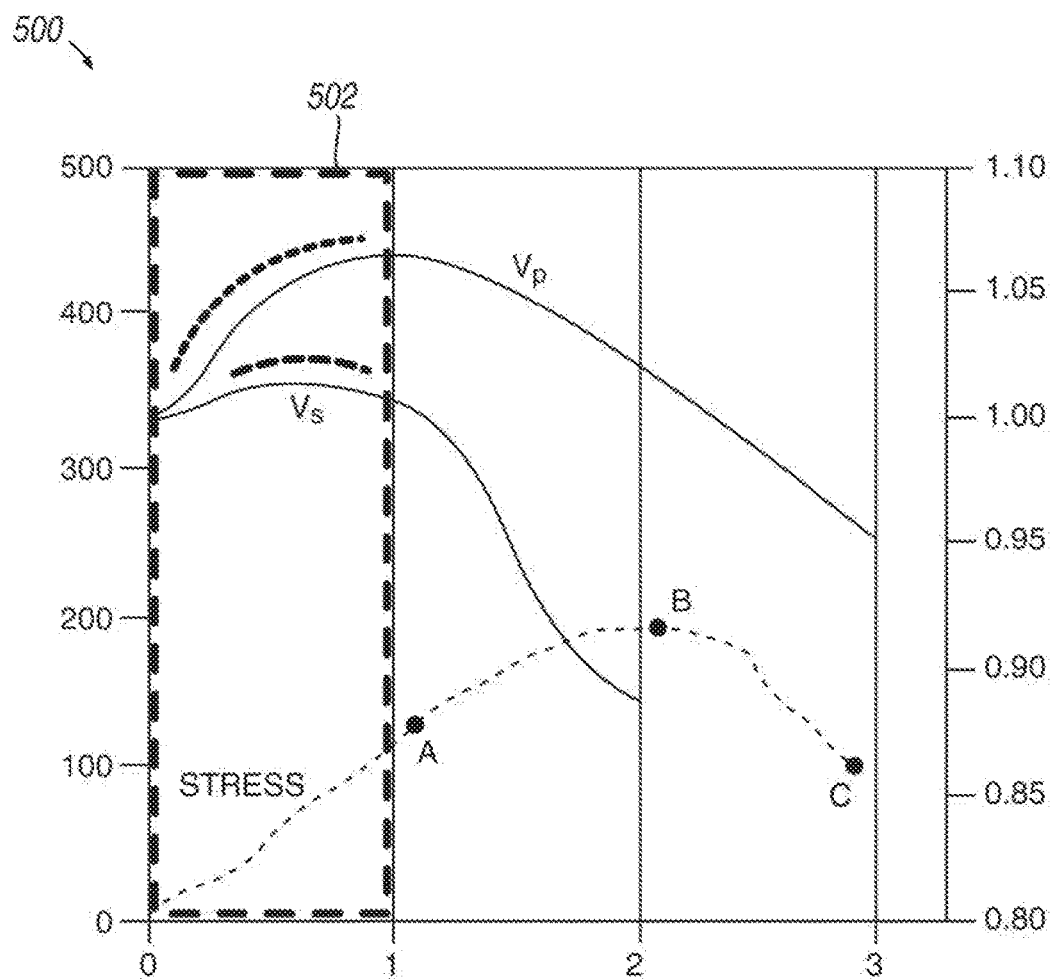
FIG. 7A provides an example chart that illustrates the non-linear relationship of acoustic slowness relative to effective stress and strain.

Based on the acoustic data, an acoustoelastic coefficient may be determined for the subsurface formation (block 456). In general, an acoustoelastic coefficient (AE) corresponds to a coefficient that defines the rate of change of slowness between acoustic slowness and stress. Referring to FIG. 7A, this figure illustrates an example chart 500 non-linear increase in compressional (P-wave) velocity ($V_p$) and shear (S-wave) velocity ($V_s$) with increasing effective stress and strain within the highlighted elastic region 502. A shown in the example chart 500, point 'A' represents a point of plastic yielding, point 'B' represents peak strength, and point 'C' corresponds to failure. A change in velocity as a function of stress within the highlighted elastic region 502 may be predicted using the AE coefficient, applied stress, and a background moduli (e.g., a background state).

Sonic logs of the acoustic data associated with the subsurface formation may be analyzed to determine compressional, dipole, crossed-dipole, quadrupole, Stoneley waveform data (block 458), and/or other such types of waveform data. Based on the waveform data determined from the acoustic data, fast and slow shear wave slowness and the polarization azimuth of the far-field fast shear wave may be determined (block 460).

Figure 7B:
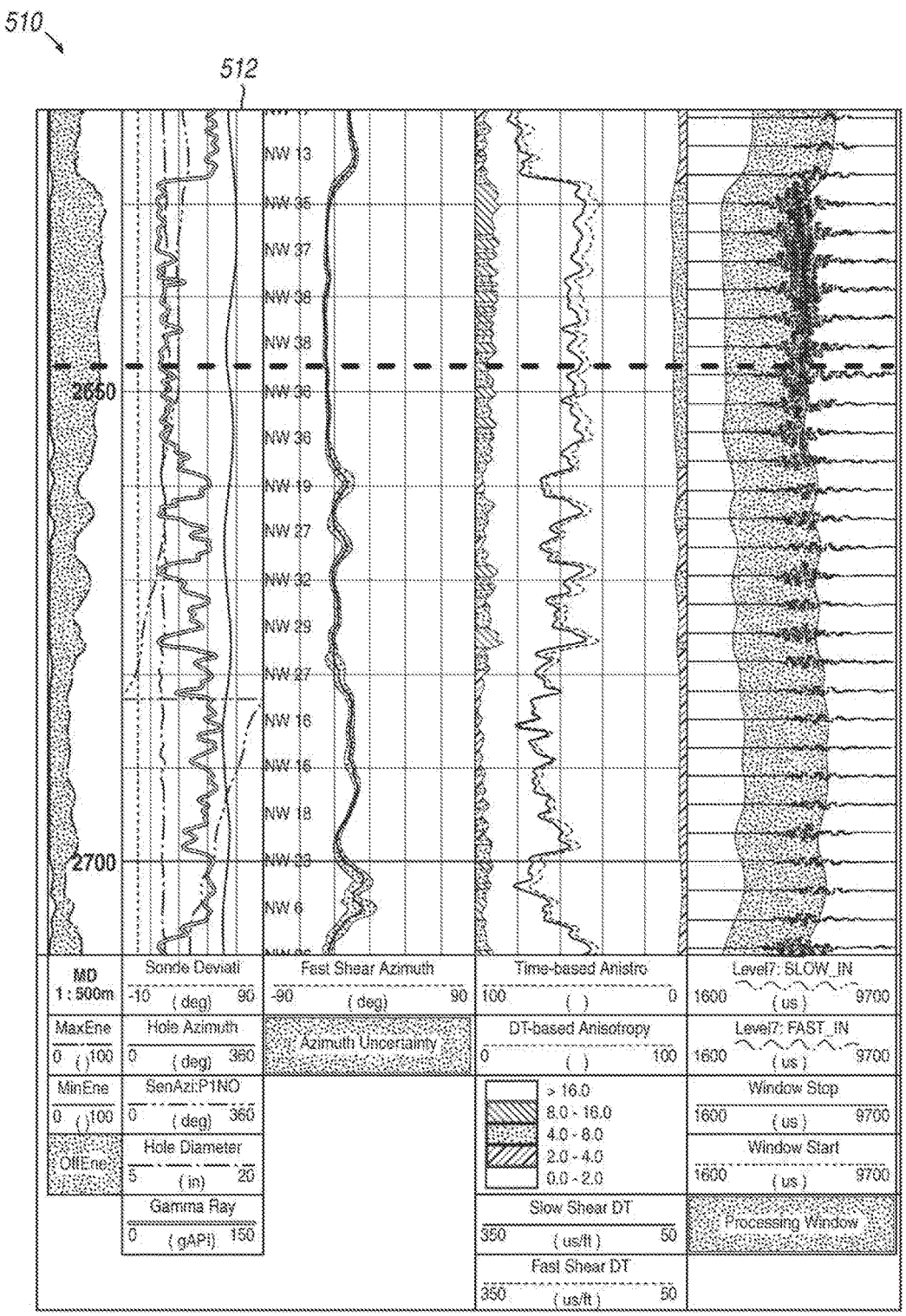
FIG. 7B provides an example chart that illustrates dipole anisotropy analysis providing an acoustic anisotropy analysis with a representative dispersion analysis plot.

At discrete depths, the fast and slow flexural and Stoneley wave data may be transformed to frequency-domain slowness, such that the slowness may be plotted versus frequency, which may be referred to as slowness-dispersion analysis. The polarization of the fast shear wave in the far-field generally corresponds to the same azimuth as the maximum horizontal stress. Referring to FIG. 7B, this figure provides an example chart 510 that includes a dipole anisotropy analysis plot 512 and a slowness-dispersion analysis plot 514 corresponding to a subsurface depth of approximately 2649.5 meters. As shown in the example, the crossover of the dipole dispersions from the fast and slow flexural waves generally corresponds to a similar signature determined for stress-induced anisotropy.

Consistent with embodiments of the invention, some acoustic data may be collected from a wellbore of an oil and gas production system. Different types of wellbores may be analyzed based at least in part on the type. For example, for a deviated wellbore, the polarization of the fast shear wave may be affected by horizontal stresses as well as a component of vertical stresses. The polarization angle may correspond to maximum subsidiary stress, where the polarization direction may be translated to a maximum horizontal stress direction as a function of a stress regime for deviated wellbores. Multiple sets of solutions may be compared for one or more wellbores drilled in different trajectories within the same stress regime, or various wellbore azimuth and deviations from the same wellbore, to determine where such sets of solutions converge to determine a stress direction and other such values for an acoustic based stress regime.

Figure 7C:
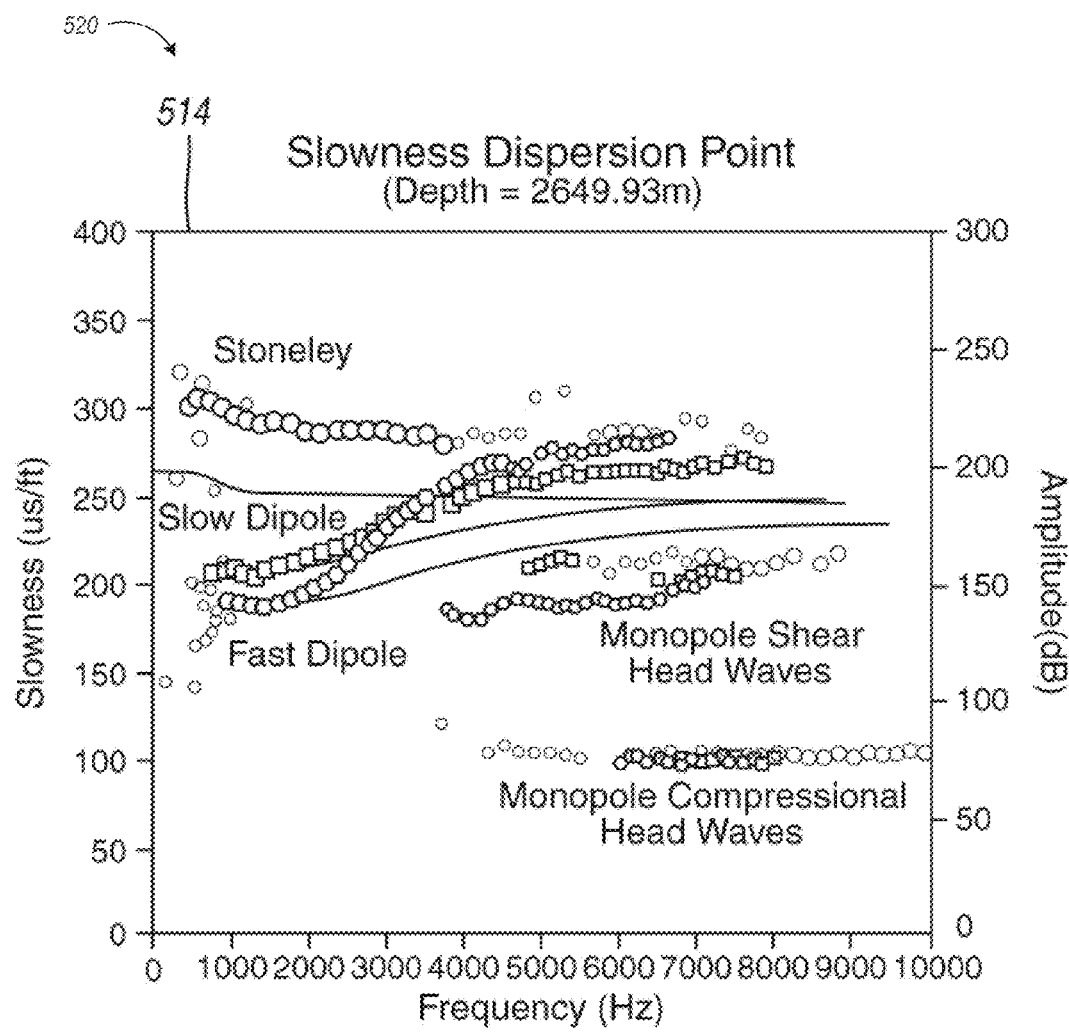
FIG. 7C provides an example chart that illustrates a stress regime factor Q as a function of the azimuth of a maximum horizontal stress for a deviated wellbore using a fast shear azimuth for stress induced anisotropy.
Figure 7D:
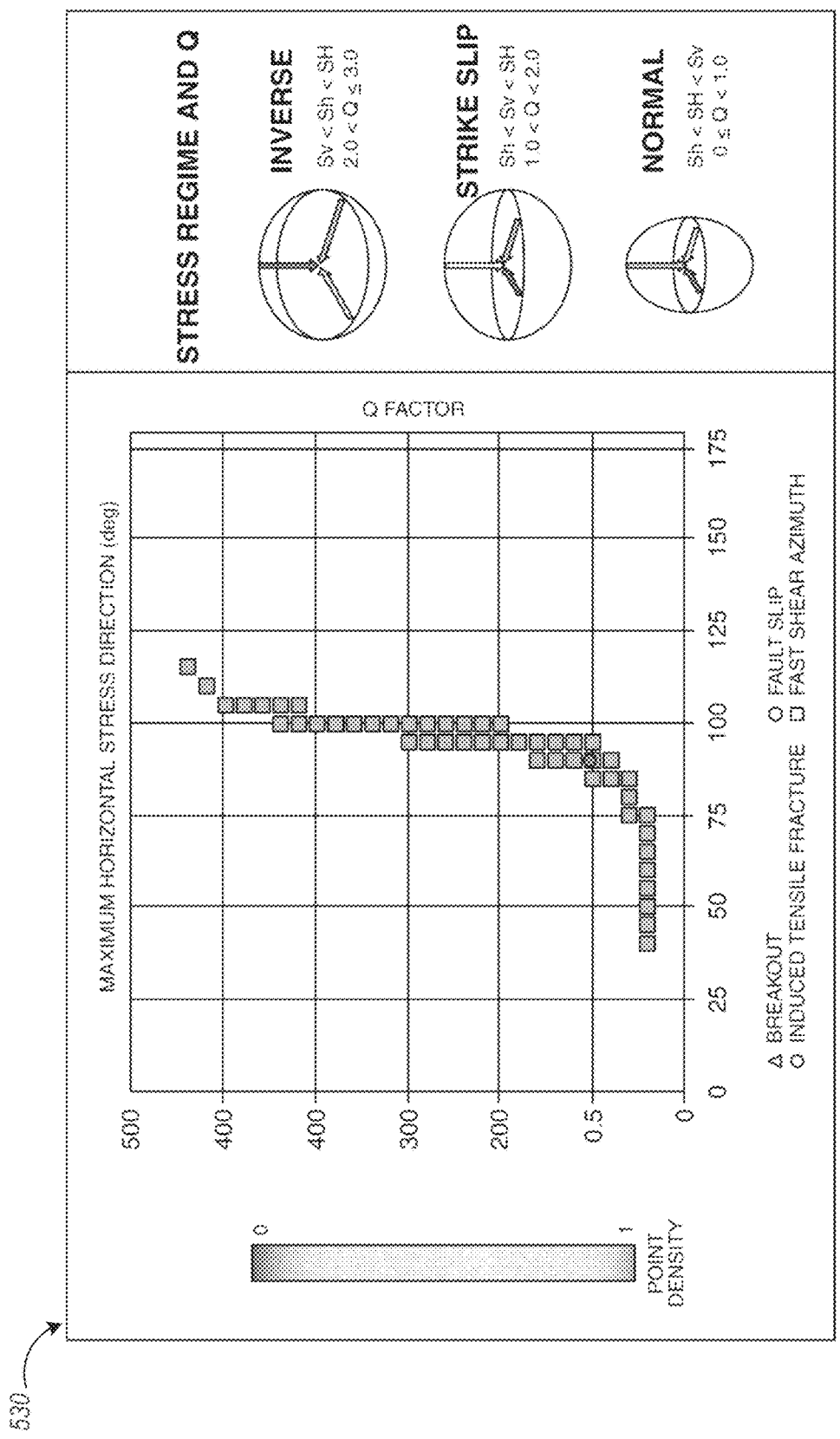
FIG. 7D provides an example chart that illustrates a stress regime factor Q for multiple solutions in deviated wellbores using a fast shear azimuth for stress induced anisotropy.

A stress regime factor 'Q' may be determined based on the acoustic data (block 464). Consistent with some embodiments, the stress regime factor Q may be determined based at least in part on the azimuth of the maximum horizontal stress for a deviated wellbore using the fast shear azimuth for stress induced isotropy. FIG. 7C provides an example chart 520 that illustrates a stress regime factor 'Q' as a function of the azimuth of the maximum horizontal stress for a deviated wellbore based on the fast shear azimuth for stress induced anisotropy. FIG. 7D provides an example chart 530 that illustrates a stress regime factor Q for multiple solutions in deviated wellbores using the fast shear azimuth for stress induced anisotropy.

Figure 7E:
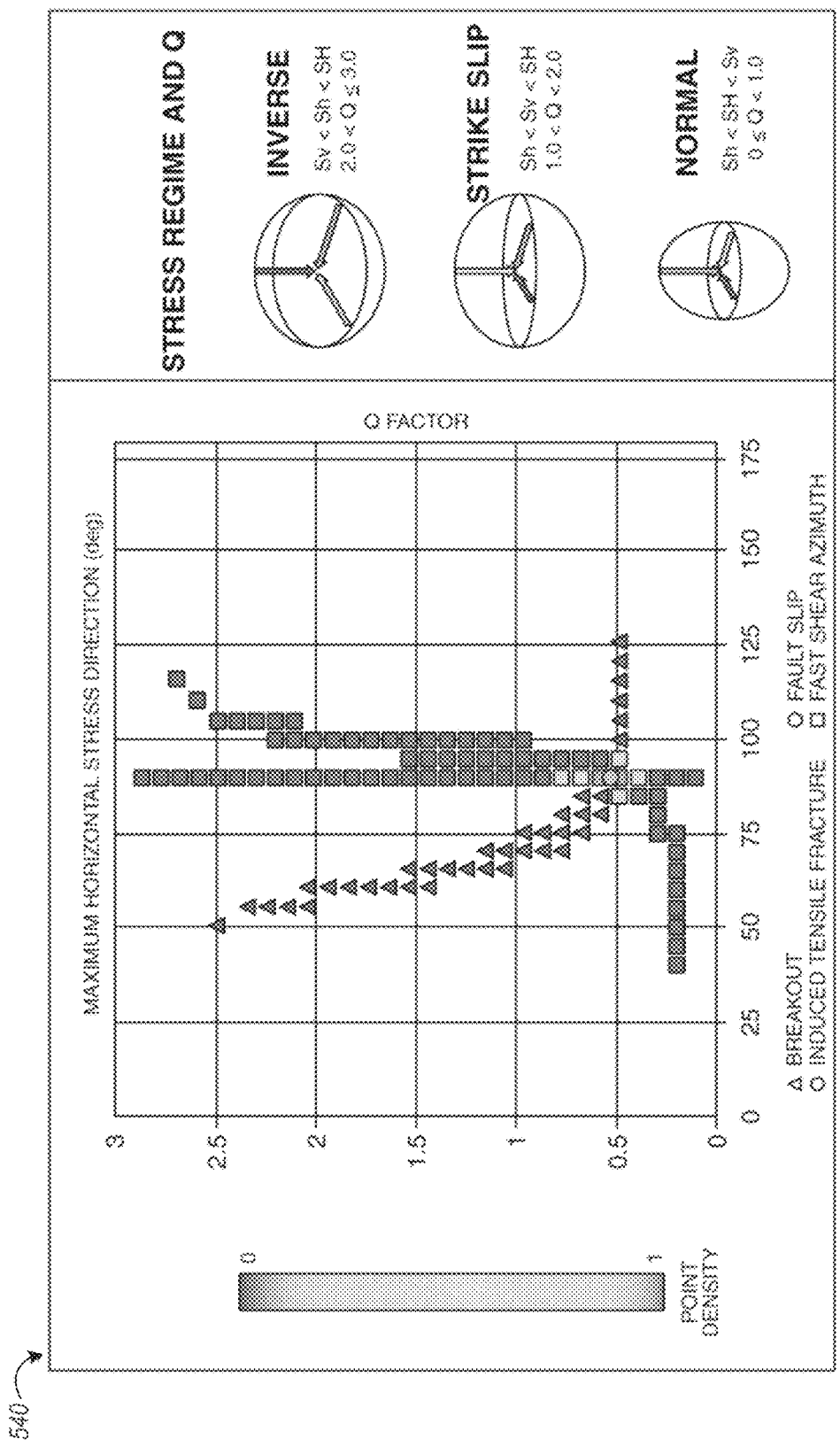
FIG. 7E provides an example chart that illustrates the relationship between a stress regime, a stress regime Q factor, stress, and shear moduli.

The stress regime factor Q generally describes a stress regime (normal, strike-slip or thrust) and the relative amount of anisotropy between 3 principal stresses (σ1, σ2, σ3). The relative change in three shear moduli c44, c55, and c66 in an isotropic medium, penetrated by a near vertical wellbore generally correspond to changes in the three principle stresses. For example, referring to FIG. 7E, this figure provides a chart 540 that illustrates the relationship between a stress regime (i.e., 'Normal Fault', 'Strike-slip Fault', and 'Thrust Fault') the stress regime Q factor, and a shear moduli ranking.

Maximum and minimum horizontal stress magnitudes may be determined (block 466). A horizontal stress profile and a vertical (overburden) stress profile may be input from a calibrated geomechanics model. The maximum horizontal stress magnitude may be determined based at least in part on the ranking of the three shear moduli.

Figure 7G:
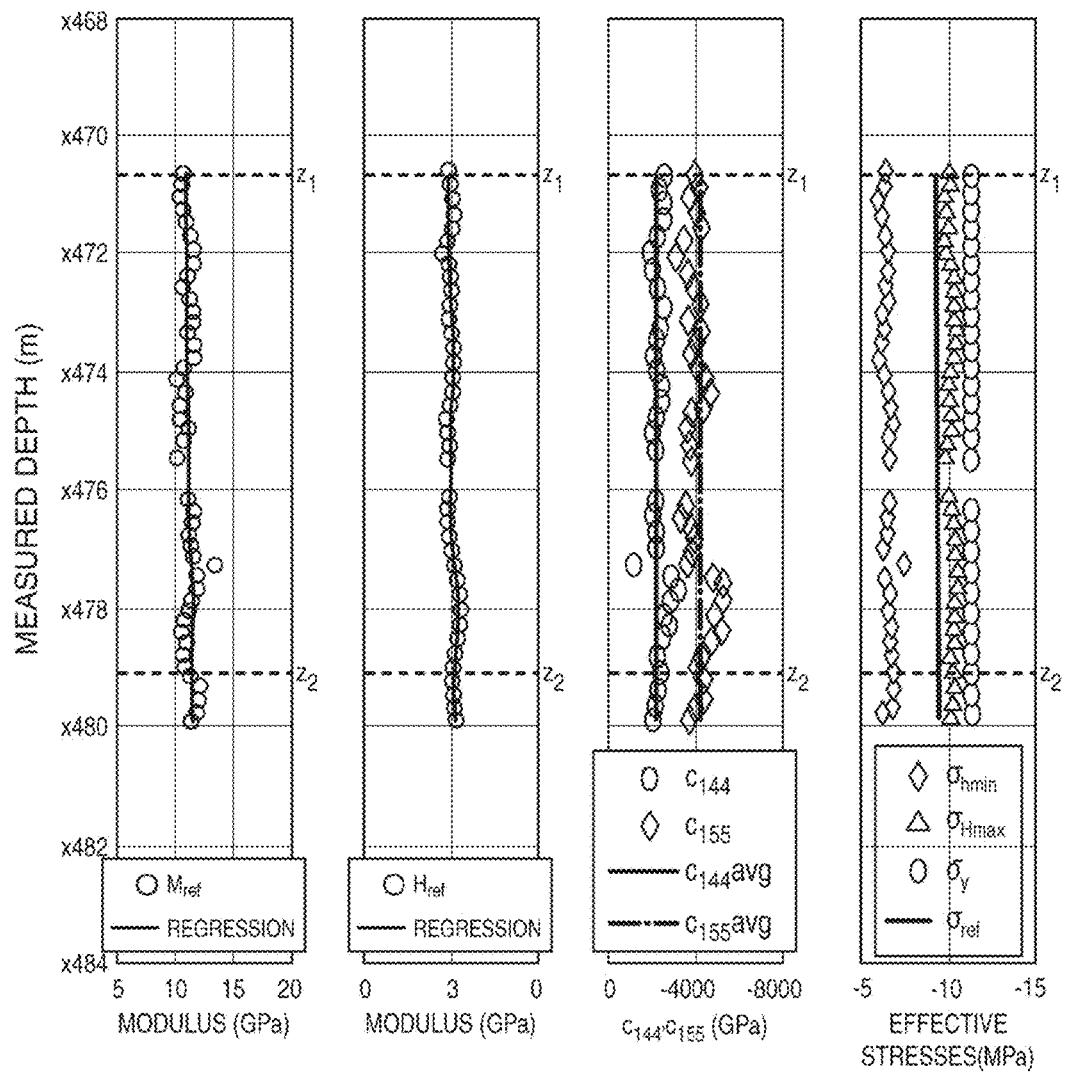
FIG. 7G provides an example chart that illustrates modulus, elastic constants, and stress distributions.

Referring to FIG. 7G, generally, the minimum and maximum stresses may be unknown. Therefore, the AE coefficient may be solved independently in relation to $C_{155}$ and $C_{144}$, corresponding to non-linear elastic constants, and p corresponding to a shear modulus in a reference state. Because four values are unknown, and only 2 equations are provided, known stress distributions of a wellbore may define the non-linear elastic coefficients. By considering that the stress distribution (using linear-elastic theory) around the wellbore may be described using Kirsch equations, and by relating the rate of change of stress around the wellbore (shear radial profiles from dipole measurements), to the rate of change of acoustic slowness, the AE coefficient or non-linear elastic constants may be estimated. If the AE coefficient is known independently, both the minimum ($\sigma_h$) and maximum ($\sigma_H$) stress magnitudes may be solved given the effective overburden stress. As provided in FIG. 7F, which provides an example chart 550 that illustrates stress magnitudes and non-linear elastic outputs using shear radial profiles and far field 3 shear moduli.

The maximum horizontal stress direction may be determined (block 468). In general, dipole sources may be orientated orthogonally to each other and processed to determine the fast and slow shear wave slowness and the polarization azimuth of the far-field fast shear wave. Therefore, the maximum horizontal stress azimuth may be determined based on the polarization of the fast shear wave in the far-field. For wellbores that are not aligned with a vertical stress, the shear radial profiles and subsequently the elastic wellbore model may be rotated with reference to the vertical stress. Minimization of differences between the elastic wellbore model and the measured radial profiles may be performed to determine the maximum horizontal stress direction.

After determining the one or more acoustic based stress values as described above, embodiments of the invention may perform sensitivity analysis for one or more input parameters when determining stress magnitudes from radial profiles (block 470). Such input parameters to be tested for sensitivity generally may comprise the three shear moduli ($C_{44}$, $C_{55}$, and $C_{66}$), Biot constant, vertical stress, and pore pressure, hole azimuth and deviation, and/or maximum stress direction. After testing input parameter sensitivity, the one or more acoustic based stress values of the acoustic based stress profile may therefore be determined (block 472).

Figure 8:
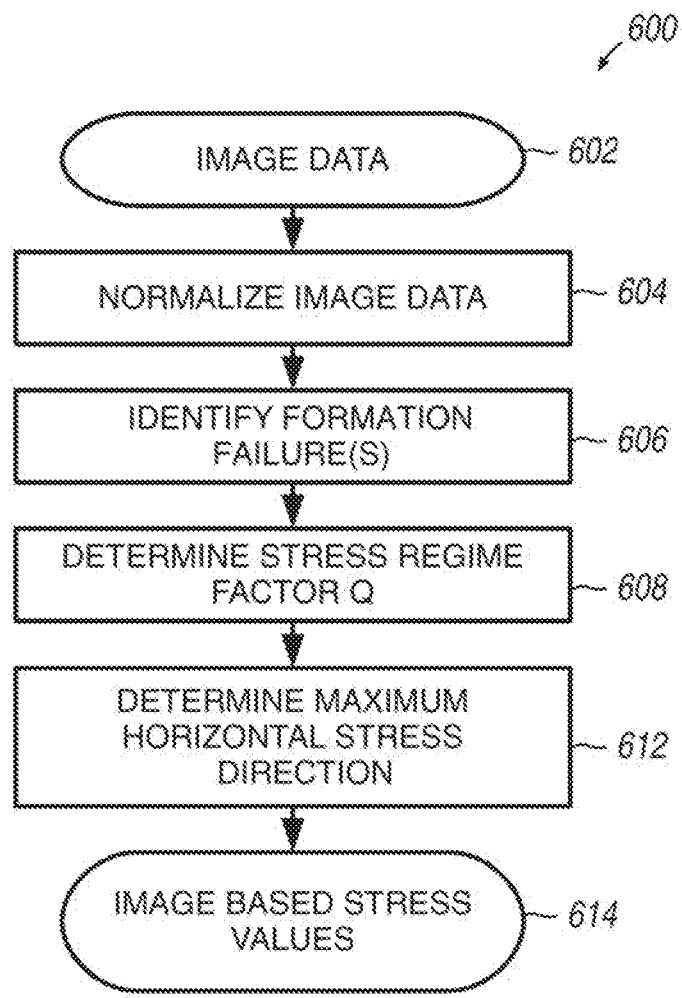
FIG. 8 provides a flowchart that illustrates a sequence of operations that may be performed by the data processing system of FIG. 1 to determine image based stress values for an image based stress profile.
Figure 9A:
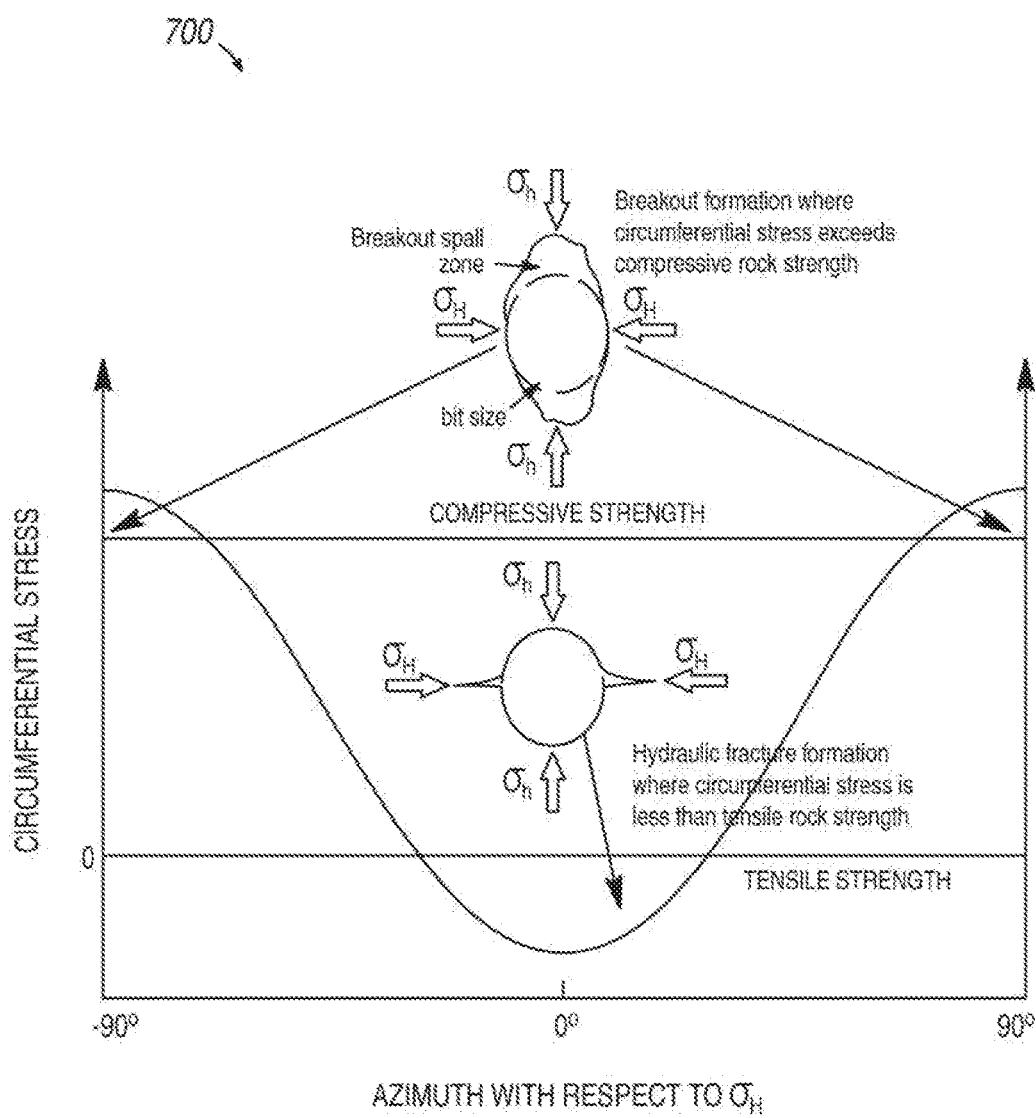
FIG. 9A provides an example chart that illustrates orientations of breakout and tensile failure in formations with respect to stresses.

Turning now to FIG. 8, this figure provides a flowchart 600 that illustrates a sequence of operations that may be performed by a computing system consistent with embodiments of the invention to determine image based stress values for an image based stress profile based on received image data (block 602). As discussed, consistent with some embodiments of the invention, the subsurface formation may be associated with an oil and gas production system that comprises one or more wellbores. In general, image data may be collected by one or more data collection devices for a wellbore, such as a wireline tool. Prior to processing the image data to determine the one or more image based stress values, the image data may be normalized (block 604). The image data may be analyzed to identify any formation failures (e.g., borehole breakouts, tensile failures such as drilling induced fractures, fault slips etc.) for the wellbore (block 606). In general, borehole breakouts may form in the direction of the minimum horizontal stress, and drilling induced fractures may form in the direction of the maximum horizontal stress. FIG. 9A provides an example diagram 700 that illustrates an orientation of breakout and tensile formation failures with respect to the maximum and minimum horizontal stresses.

Figure 9B:
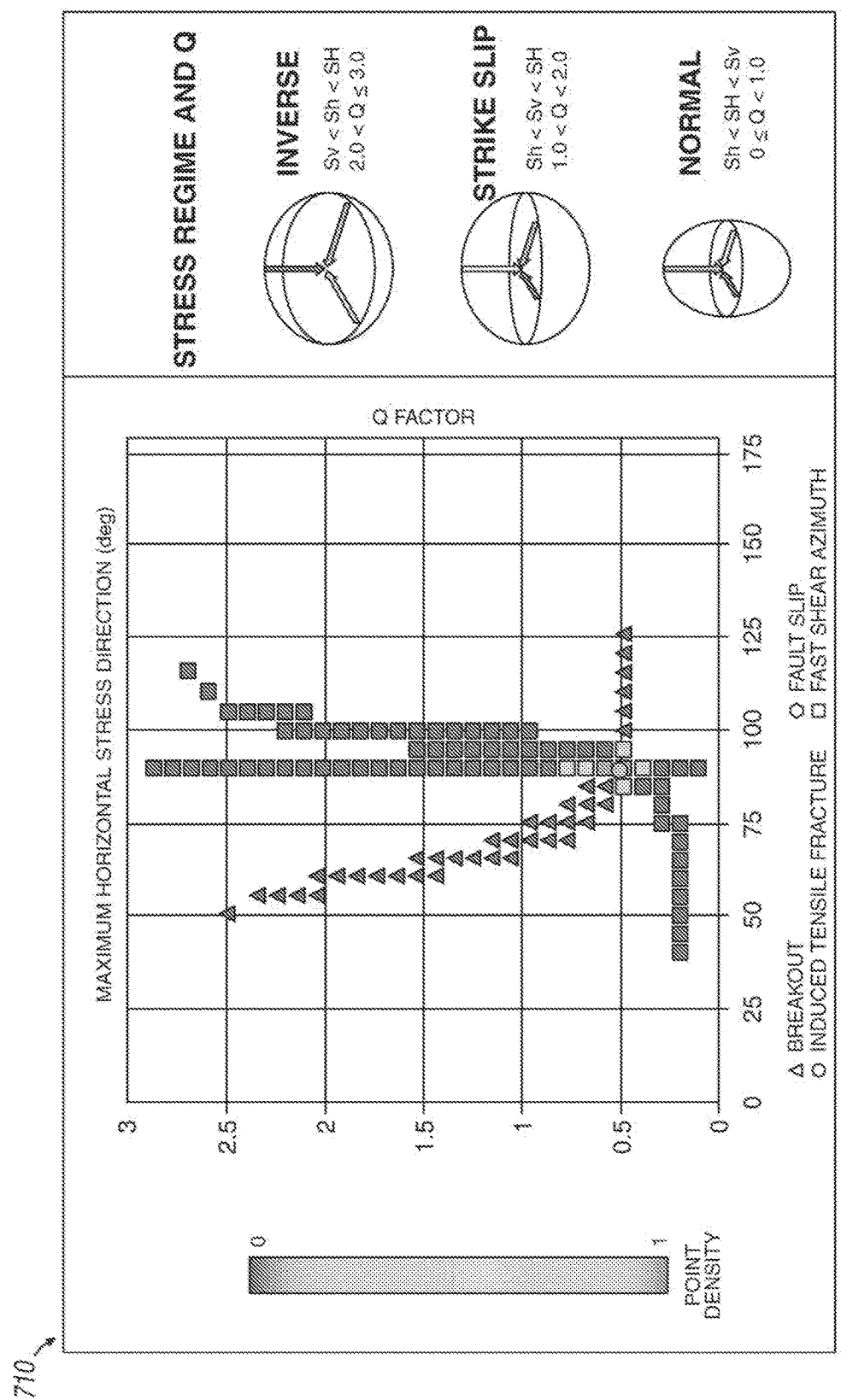
FIG. 9B provides an example chart that illustrates a stress regime factor Q for multiple solutions in deviated wellbores using wellbore failure observations.

Based on the identified formation failures, a set of solutions related to stress based values may be determined. If more than one wellbore is associated with the subsurface formation, multiple sets of solutions may be determined for stress direction and regime. Based on the identified formation failures, a stress regime factor Q may be determined (block 608). As discussed above with respect to stress induced anisotropy for acoustics, determining the maximum horizontal stress direction as a function of the stress regime factor Q may be determined based at least in part on formation failures. Sensitivity analysis may also be performed for the ratio of the differences in horizontal stresses over vertical stresses. FIG. 9B provides an example chart 710 that illustrates a stress regime factor Q for multiple solutions in deviated wellbores based at least in part on formation failure observations. The maximum horizontal stress may be determined (block 612) based at least in part on a strength associated with the subsurface formation (e.g., rock strength) and a minimum horizontal stress, and the one or more image based stress values (block 614) may therefore be determined.

Figure 10:
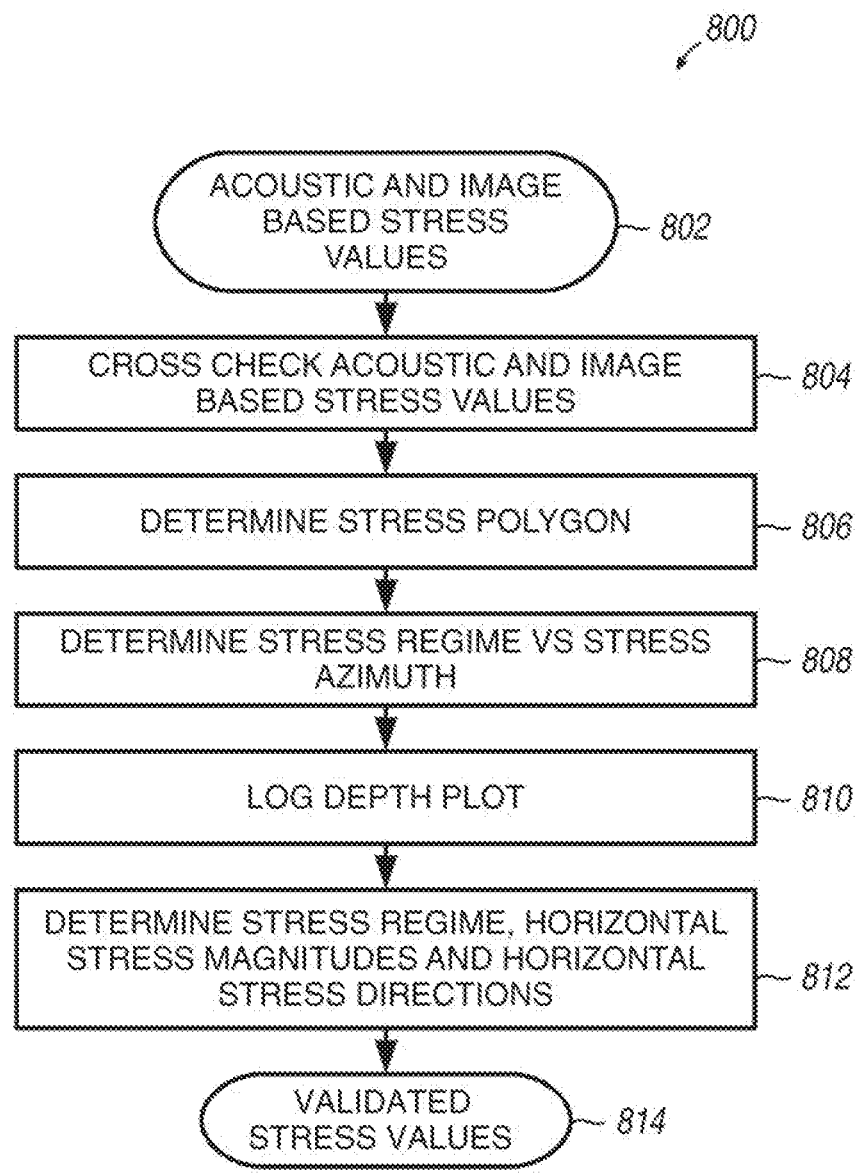
FIG. 10 provides a flowchart that illustrates a sequence of operations that may be performed by the data processing system of FIG. 1 to generate an integrated stress profile.

FIG. 10 provides a flowchart 800 that illustrates a sequence of operations that may be performed by a computing system consistent with embodiments of the invention to integrate acoustic based stress values and image based stress values (block 802) for generating an integrated stress profile for a subsurface volume. The acoustic based stress values and the image based stress values may be cross-checked for consistency (block 804).

The consistency check may comprise checking the maximum stress direction, the stress regime factor Q, the maximum stress to minimum stress ratio, and/or the maximum stress magnitude and the minimum stress magnitude determined for the acoustic based stress values and the image based stress values. With regard to the maximum stress direction determined for the acoustic based stress profile, the fast shear azimuth with flexural dispersion crossover in vertical wellbores may be checked based at least in part on the intersection of 2 or more solutions of the fast shear azimuth as compared to the stress regime factor Q in deviated wellbores. Similarly, with regard to the maximum stress direction determined for the image based stress profile, the direction of drilling induced fractures or wellbore breakouts in vertical wellbores may be checked based at least in part on the intersection of 2 or more solutions of the wellbore failure as compared to the stress regime factor Q in deviated wellbores.

Consistent with some embodiments of the invention, acoustic based stress values and image based stress values may be cross-checked based on data collected from micro-hydraulic fracturing testing or mini-frac testing. For generally vertical wellbores, a minimum horizontal stress may be estimated based on mini-frac testing based at least in part on closure pressure of a tensile fracture. Generally, tensile fractures may be caused by an inflatable packer module (e.g., a dual-packer, etc.). Closure pressure may be measured at a point at which pressure decline deviates from a linear dependence on a square root of shut in time. Moreover, other tests, such as step rate tests and/or flow-back tests may be used to determine a minimum horizontal stress. Similarly, maximum horizontal stress may be estimated from data collected during mini-frac testing based at least in part on tensile failure criteria within a wellbore. A fracture initiation (or breakdown) may be related to a minimum horizontal stress ($\sigma_{hmin}$), tensile rock strength (T), maximum horizontal stress ($\sigma_{Hmax}$) and a differential pressure between the wellbore and formation pore pressure ($p_0$) based on the following equation:

$P_i = 3\sigma_{hmin} - \sigma_{Hmax} + T - p_0$. The relative ranking of the 3 shear moduli for vertical wellbores associated with the acoustic based stress profile may be checked based at least in part on the intersection of 2 or more solutions of the fast shear azimuth compared to the stress regime factor Q in deviated wellbores to thereby consistency check the stress regime factor Q. The stress regime factor Q of the image based stress profile may be checked for consistency based at least in part on the intersection of 2 or more solutions of the wellbore failure as compared to the stress regime factor Q in deviated wellbores. The maximum stress to minimum stress ratio of the acoustic based stress profile may be checked for consistency based at least in part on a given vertical stress and the 3 shear moduli by determining a horizontal stress ratio in vertical wellbores. The maximum to minimum stress ratio of the image based stress profile may be checked for consistency based at least in part on wellbore failure models associated with subsurface formation strengths (e.g., rock strengths), minimum horizontal stresses, and the presence of formation failures, where the wellbore failure models may be compared with the identified formation failures. The maximum stress magnitude and minimum stress magnitudes determined for the acoustic based stress profile may be checked for consistency based at least in part on a given vertical stress, Biot constant and pore pressure with a non-linear elastic borehole model with the shear radial profiles and far-field 3 shear moduli within vertical and/or deviated wellbores.

Figure 11:
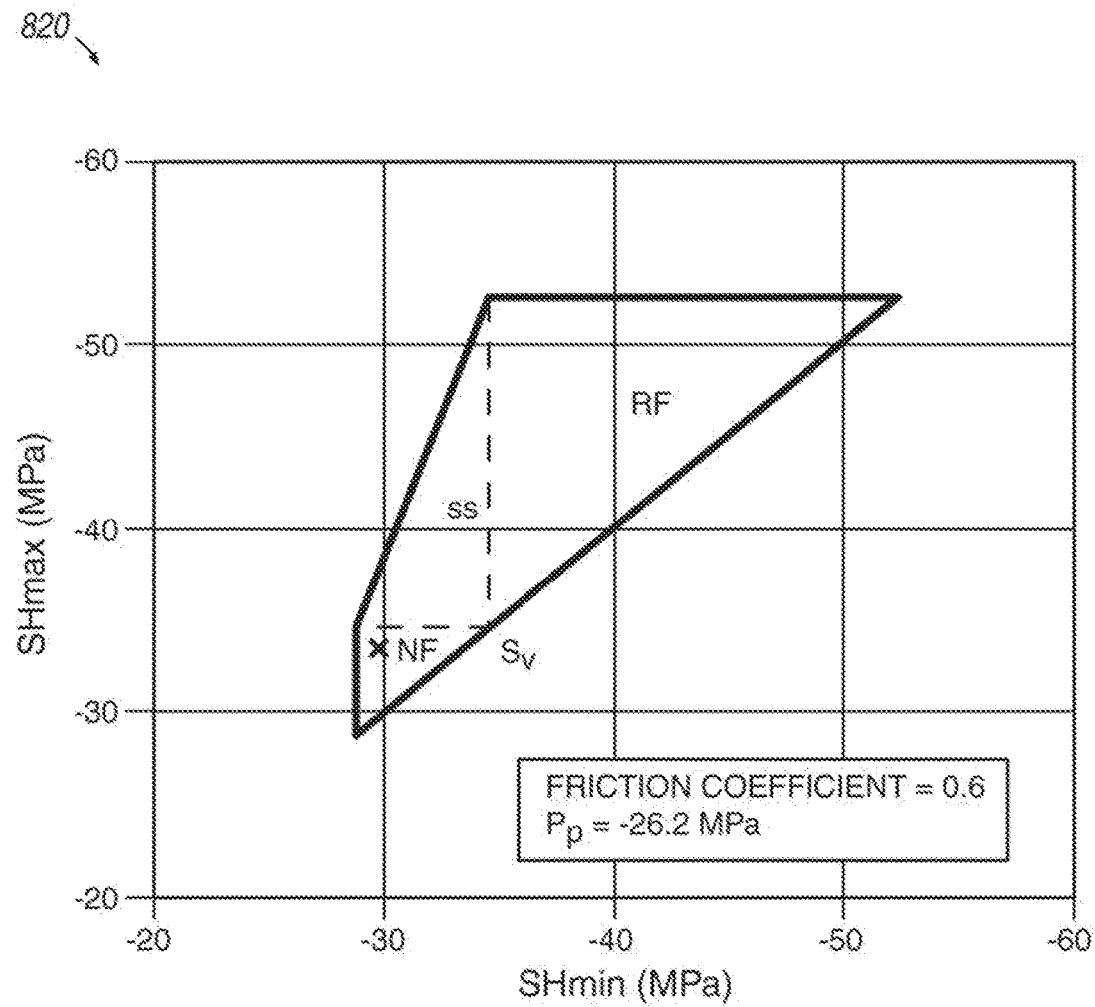
FIG. 11 provides a block diagram that illustrates input data for operations consistent with some embodiments of the invention and output data that may be generated thereby.

Based on the acoustic based stress values and the image based stress values, a stress polygon associated with the subsurface formation may be determined (block 806). In general, the stress polygon may be based at least in part on a stress state of the subsurface volume, a pore pressure associated with the subsurface formation, and/or frictional strength of preexisting fractures and/or faults. Generally, the stress polygon may be determined based at least in part on a relationship between the three principal stresses for minimum and maximum failure criteria of rock mass of the subsurface formation. In general, the stress polygon describes an upper and lower bound between tensile and shear failure criteria for a rock mass based at least in part on an amount of difference between the three principle stresses. FIG. 11 provides an example chart 820 of a stress polygon that generally describes possible minimum and maximum stress magnitudes at a particular depth, where 'RF' denotes reverse faulting, 'SS' denotes strike-slip faulting, and 'NF' denotes normal faulting stress regimes.

Returning to FIG. 10, a stress regime relative to a stress azimuth may be determined the subsurface formation (block 808) based at least in part on the acoustic based stress values, the image based stress values, and/or the stress polygon. A log depth plot may be generated for the subsurface formation (block 810). In general, a log depth plot may correspond to the stress magnitudes at any depth for a subsurface formation that exhibits stress related characteristics/features from acoustic measurements and/or observed failures from wellbore image. The log depth plot may be based at least in part on the stress related characteristics/features along a depth profile of the wellbore. Based on the determined stress polygon, the consistency checked image and acoustic based stress values, the stress regime as compared to the stress azimuth, and/or the log depth plot, the stress regime, the maximum and minimum horizontal stress magnitudes, the maximum and minimum horizontal stress directions may be determined for the subsurface formation (block 812) to thereby generate the integrated stress profile (block 814).

Therefore, consistent with embodiments of the invention, an integrated stress profile may be generated. The integrated stress profile may be integrated into a model, and/or a model may be generated based at least in part thereon. As described herein, input data may comprise acoustic data and/or image data that may be collected from a surface data collection device and/or one or more wellbore data collection devices for one or more wellbores. Types of data that may be input comprise, for example, full waveform acoustics logs (dipole shear, compressional, and/or Stoneley), wellbore images (resistivity, induction, and/or acoustic), caliper logs, petrophysical logs (density, lithology, etc.), formation density profile data (e.g., surface, overburden stress, pore pressure, etc.), drilling data (e.g., well deviation, wellbore pressure, etc.), and/or other such data that may be collected for an oil field comprising one or more wellbores of an oil and gas production system.

Figure 12:
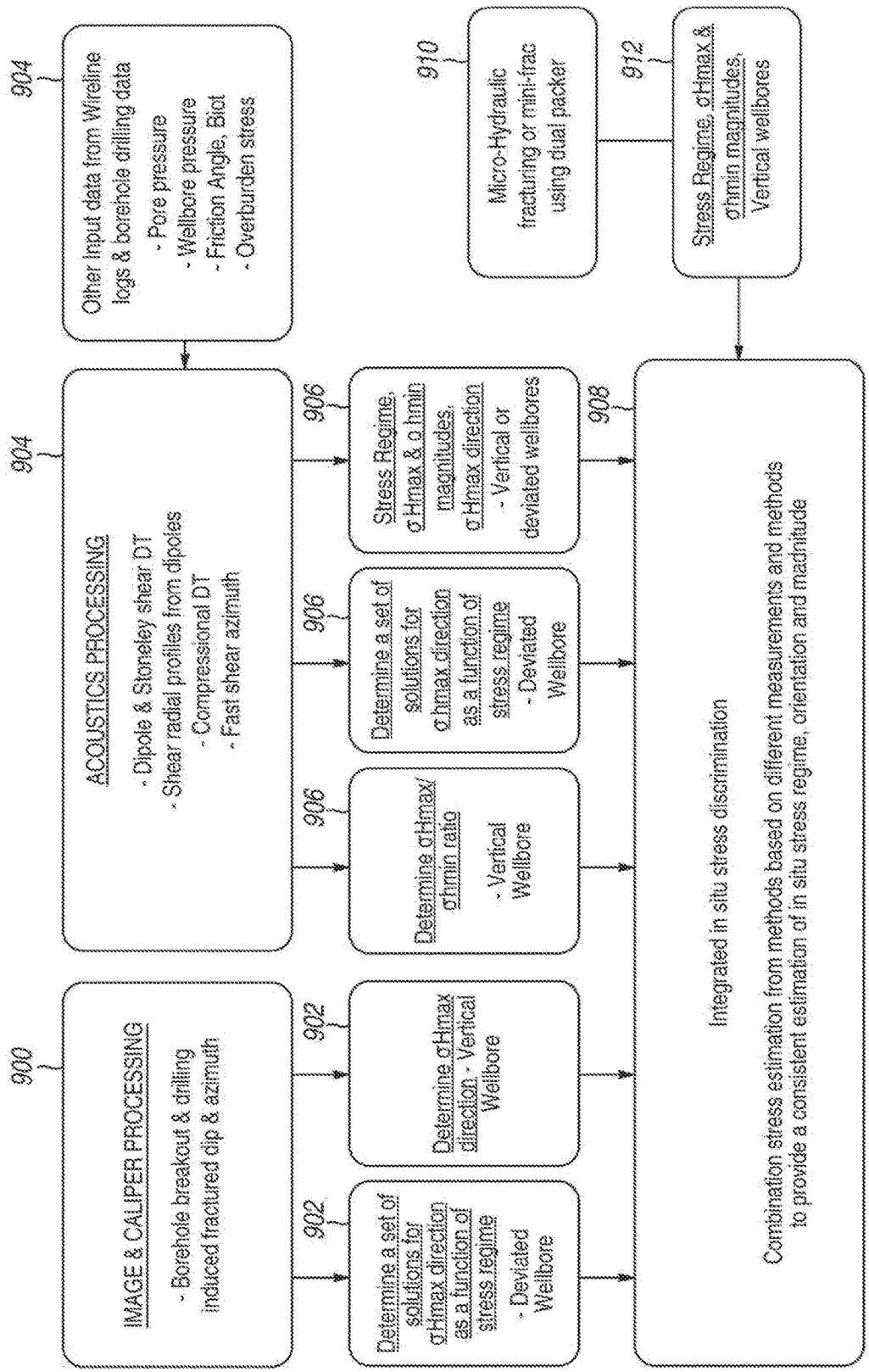
FIG. 12 provides a block diagram that illustrates input data for image and caliper processing for determining one or more image based stress related values and input data for acoustic processing for determining one or more acoustic based stress values.

FIG. 12 provides a block diagram that illustrates input data for image and caliper processing 900 for determining one or more image based stress related values 902 and input data for acoustic processing 904 for determining one or more acoustic based stress values 906. The input data for image and caliper processing may include borehole formation failures and drilling induced fracture dip and azimuth image data. The input data for acoustic processing 904 may include dipole and Stoneley well logs (i.e., dipole and Stoneley DT) as well as petrotechnical data for well bores (e.g., pore pressure, wellbore pressure, friction angle, Biot constant, and/or overburden stress). The image based stress values 902 and acoustic based stress values 906 may be integrated to determine an integrated stress profile 908. Image based stress values 902 may include a set of solutions for a maximum stress direction as a function of a stress regime, a wellbore type for which the stress values correspond (e.g., deviated or vertical). Acoustic based stress values may include a maximum stress to minimum stress ratio, a set of solutions for a maximum stress direction as a function of a stress regime, a stress regime, a maximum stress magnitude, a minimum stress magnitude, a maximum stress direction, and/or a wellbore type for which the stress values correspond (e.g., deviated or vertical). The integrated stress profile 908 may include an integrated in situ stress discrimination that corresponds to a combination stress estimation that includes maximum stress magnitude and direction, minimum stress magnitude and direction, stress regime, and/or other such values that may characterize an in situ stress regime.

Figure 13:
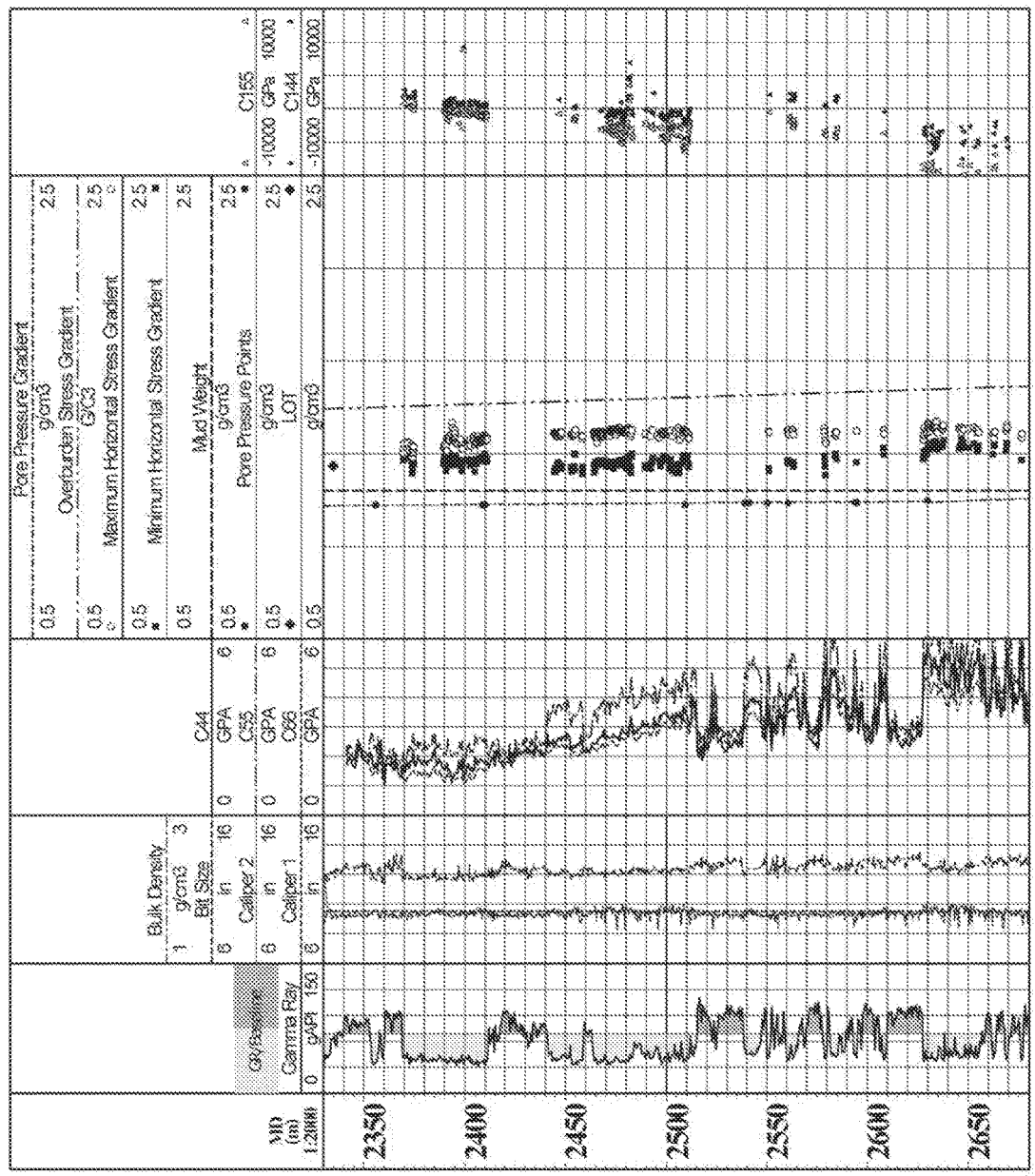
FIG. 13 provides an example chart that provides example discrete stress magnitude values that may be determined based at least in part on acoustic data consistent with some embodiments of the invention.
Figure 14:
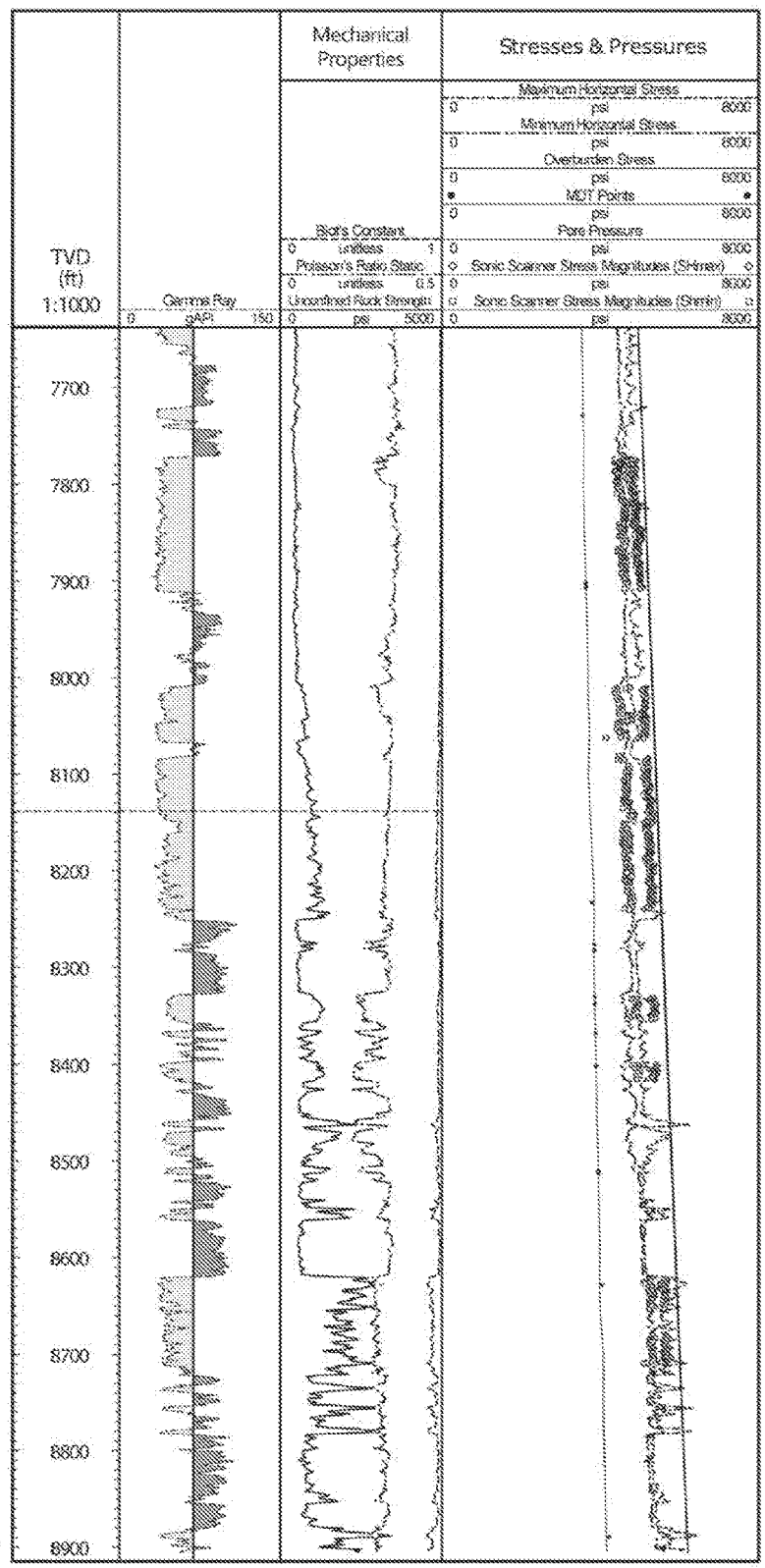
FIG. 14 provides an example chart that provides an example integrated continuous stress profile that may be based at least in part on stress values determined from acoustic data and/or image data consistent with some embodiments of the invention.

Moreover, in some embodiments, data collected from micro-hydraulic fracturing and/or mini-frac testing 910 may be analyzed to determine a stress regime, a maximum horizontal stress magnitude, and/or a minimum horizontal stress magnitude from one or more vertical wellbores 912. As discussed above, these stress related values 912 may be used for consistency checking the image based stress values and/or the acoustic based stress values when generating the integrated stress profile 908. FIG. 13 provides an example chart 950 that provides example discrete stress magnitude values that may be determined based at least in part on acoustic data consistent with some embodiments of the invention. FIG. 14 provides an example chart 980 that provides an example integrated continuous stress profile that may be based at least in part on stress values determined from acoustic data and/or image data consistent with some embodiments of the invention.

While some embodiments of the invention have been described with regard to wellbores, oil fields, and/or oil and gas production systems, the invention is not so limited. Some embodiments of the invention may correspond to other types of drilling and/or subsurface exploration, modeling, and/or monitoring environments. For example, some embodiments of the invention may generate an integrated stress profile for a subsurface formation associated with a mine shaft, a water well, and/or other such types of subsurface operations.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the present invention has been illustrated by a description of various embodiments and while these embodiments have been described in considerable detail, it is not the intention of the Applicant to restrict or in any way limit the scope of the appended claims to such detail. For example, the operations represented by blocks of the flowcharts included herein may be reorganized, performed concurrently, and/or sequentially in any order. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method for modeling subsurface formations, the method comprising:
   receiving acoustic data and image data for a subsurface formation;
   analyzing, with at least one processor, the acoustic data to determine acoustic based stress values for the subsurface formation;
   analyzing, with the at least one processor, the image data to determine image based stress values for the subsurface formation;
   integrating, with the at least one processor, the acoustic based stress values and the image based stress values to generate an integrated stress profile for the subsurface formation; and
   generating, with the at least one processor, a model for the subsurface formation comprising modeled stress values for the subsurface formation based at least in part on the integrated stress profile,
   wherein:
      determining the acoustic based stress values comprises determining a maximum stress direction of the acoustic data, a stress regime factor Q of the acoustic data, a maximum stress to minimum stress ratio of the acoustic data, a maximum stress magnitude of the acoustic data, and a minimum stress magnitude of the acoustic data;
      determining the image based stress values comprises determining a maximum stress direction of the image data, a stress regime factor Q of the image data, a maximum stress to minimum stress ratio of the image data, a maximum stress magnitude of the image data, and a minimum stress magnitude of the image data; and
      generating an integrated stress profile comprises integrating the acoustic based stress values and the image based stress values comprises checking a consistency of the maximum stress direction of the acoustic data, the stress regime factor Q of the acoustic data, the maximum stress to minimum stress ratio of the acoustic data, the maximum stress magnitude of the acoustic data, and the minimum stress magnitude of the acoustic data respectively against the maximum stress direction of the image data, the stress regime factor Q of the image data, the maximum stress to minimum stress ratio of the image data, the maximum stress magnitude of the image data, and the minimum stress magnitude of the image data.

2. The method of claim 1, wherein analyzing the acoustic data to determine acoustic based stress values for the subsurface formation comprises analyzing the acoustic data using cross-dipole anisotropy to determine one or more of dipole shear wave velocities radial profiling, Stoneley shear wave velocity shear wave radial profiling, and compressional wave velocity.

3. The method of claim 1, wherein the acoustic data comprises waveform acoustics logs corresponding to one or more of dipole shear, compressional, and Stoneley waveforms.

4. The method of claim 1, wherein the image data comprises image data associated with a wellbore corresponding to one or more of resistivity, induction, and acoustic based images.

5. The method of claim 1, wherein analyzing the image data to determine image based stress values for the subsurface formation comprises normalizing the image data.

6. The method of claim 1, wherein the subsurface formation is associated with an oil and gas production system comprising at least one wellbore, and the acoustic data is collected from at least one surface collection device and at least one wellbore collection device.

7. The method of claim 1, wherein checking the consistency of the acoustic based stress values and the image based stress values is based at least in part on data collected during micro-hydraulic fracturing testing for at least one wellbore associated with the subsurface formation.

8. The method of claim 1, wherein the integrated stress profile includes a maximum horizontal stress direction and a maximum horizontal stress magnitude for at least one subsurface volume of the subsurface formation.

9. The method of claim 1, further comprising:
   receiving wellbore related data including one or more of pore pressure data, wellbore pressure data, friction angle, Biot constant, and overburden stress, wherein the integrated stress profile is based at least in part on the wellbore related data.

10. The method of claim 1, wherein the subsurface formation is associated with a plurality of wellbores of an oil and gas production system, and determining the acoustic based stress values comprises:
    determining a solution for a maximum stress direction for each wellbore to thereby determine a set of solutions for the maximum stress direction,
    wherein the integrated stress profile is based at least in part on the set of solutions for the maximum stress direction.

11. A system comprising:
    at least one processor; and
    a computer-readable storage device comprising a program code stored thereon and configured to be executed by the at least one processor to cause the system to perform operations comprising:
       analyzing acoustic data to determine acoustic based stress values for a subsurface formation;
       analyzing image data to determine image based stress values for the subsurface formation;
       integrating the acoustic based stress values and the image based stress values to generate an integrated stress profile for the subsurface formation; and
       generating a model of the subsurface formation based at least in part on the integrated stress profile,
       wherein:
          determining the acoustic based stress values comprises determining a maximum stress to minimum stress ratio of the acoustic data;
          determining the image based stress values comprises determining a maximum stress to minimum stress ratio of the image data; and integrating the acoustic based stress values and the image based stress values comprises checking a consistency of the maximum stress to minimum stress ratio of the acoustic data against the maximum stress to minimum stress ratio of the image data.

12. The system of claim 11, wherein the program code is configured to analyze the acoustic data to determine acoustic based stress values for the subsurface formation by:
analyzing the acoustic data using cross-dipole anisotropy to determine one or more of shear wave velocities radial profiling, Stoneley shear wave velocity radial profiling, and compressional wave velocity.

13. The system of claim 11, wherein the acoustic data comprises waveform acoustics logs corresponding to one of more of dipole shear, compressional, and Stoneley waveforms.

14. The system of claim 11, wherein the image data comprises image data associated with a wellbore corresponding to one of more of resistivity, induction, and acoustic based images.

15. The system of claim 11, wherein the subsurface formation is associated with an oil field comprising at least one wellbore, the acoustic data is collected from at least one surface data collection device and at least one wellbore data collection device, and the image data is collected from at least one wellbore data collection device.

16. The system of claim 11, wherein integrating the acoustic based stress values and the image based stress values to generate an integrated stress profile for the subsurface formation comprises checking the acoustic based stress values and the image based stress values for consistency.

17. The system of claim 11, wherein the integrated stress profile includes a maximum horizontal stress direction and a maximum horizontal stress magnitude for the subsurface formation.

18. A computer program product, comprising:
a non-volatile computer readable medium; and
program code stored on the computer readable medium and configured, upon execution by at least one processor, to cause the processor to perform operations comprising:
analyzing acoustic data to determine acoustic based stress values for a subsurface volume;
analyzing image data to determine image based stress values for the subsurface formation;
integrating the acoustic based stress values and the image based stress values to generate an integrated stress profile for the subsurface formation; and
generating a model of the subsurface formation based at least in part on the integrated stress profile,
wherein:
determining the acoustic based stress values comprises determining a maximum stress to minimum stress ratio of the acoustic data;
determining the image based stress values comprises determining a maximum stress to minimum stress ratio of the image data; and
integrating the acoustic based stress values and the image based stress values comprises checking a consistency of the maximum stress to minimum stress ratio of the acoustic data against the maximum stress to minimum stress ratio of the image data.

19. The method of claim 1, wherein checking the consistency of the maximum stress direction of the acoustic data against the maximum stress direction of the image data comprises checking a fast shear azimuth with flexural dispersion crossover based on the intersection of two or more solutions of the fast shear azimuth compared to a stress regime factor Q.

20. The method of claim 1, wherein checking the consistency of the maximum stress direction of the acoustic data against the maximum stress direction of the image data comprises checking a the direction of drilling induced fractures or wellbore breakouts based on the intersection of two or more solutions of wellbore failure compared to a stress regime factor Q.

21. A method for modeling subsurface formations, the method comprising:
determining, using a processor, acoustic based stress values for a subsurface formation by analyzing acoustic data of the subsurface formation;
determining, using the processor, image based stress values for the subsurface formation by analyzing image data of the subsurface formation;
generating, using the processor, an integrated stress profile of the subsurface formation by integrating the acoustic based stress values and the image based stress values; and
generating, using the processor, a model for the subsurface formation comprising modeled stress values for the subsurface formation based at least in part on the integrated stress profile,
wherein:
determining the acoustic based stress values comprises determining a maximum stress to minimum stress ratio of the acoustic data;
determining the image based stress values comprises determining a maximum stress to minimum stress ratio of the image data; and
integrating the acoustic based stress values and the image based stress values comprises checking a consistency of the maximum stress to minimum stress ratio of the acoustic data against the maximum stress to minimum stress ratio of the image data.

* * * * *